United States Patent
Chung et al.

(10) Patent No.: US 9,438,326 B2
(45) Date of Patent: *Sep. 6, 2016

(54) METHOD AND APPARATUS FOR TRANSMITTING REFERENCE SIGNAL

(71) Applicant: LG ELECTRONICS INC., Seoul (KR)

(72) Inventors: Jae Hoon Chung, Anyang-si (KR); Hyun Soo Ko, Anyang-si (KR); Moon Il Lee, Anyang-si (KR); Yeong Hyeon Kwon, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/626,055

(22) Filed: Feb. 19, 2015

(65) Prior Publication Data

US 2015/0162964 A1 Jun. 11, 2015

Related U.S. Application Data

(63) Continuation of application No. 14/254,602, filed on Apr. 16, 2014, now Pat. No. 9,014,127, which is a (Continued)

(51) Int. Cl.
*H04W 4/00* (2009.01)
*H04B 7/04* (2006.01)
(Continued)

(52) U.S. Cl.
CPC .......... *H04B 7/0473* (2013.01); *H04B 7/0678* (2013.01); *H04B 7/0684* (2013.01);
(Continued)

(58) Field of Classification Search
CPC  H04W 72/04; H04W 40/244; H04B 7/0473; H04B 7/0678
USPC ........................................................ 370/325
See application file for complete search history.

(56) References Cited

U.S. PATENT DOCUMENTS

| | | |
|---|---|---|
| 2009/0011767 A1 | 1/2009 | Malladi et al. |
| 2010/0104034 A1 | 4/2010 | Nam et al. |

FOREIGN PATENT DOCUMENTS

| | | |
|---|---|---|
| JP | 5607807 | 10/2014 |
| WO | 2009/157168 | 12/2009 |

OTHER PUBLICATIONS

Nortel, "Uplink Adaptive Transmission with TP", 3GPP TSG-RAN Working Group 1 Meeting #45, R1-061235, May 2006.

(Continued)

*Primary Examiner* — Sai-Ming Chan
(74) *Attorney, Agent, or Firm* — Lee, Hong, Degerman, Kang & Walmey; Jonathan Kang; Michael Monaco

(57) ABSTRACT

The present invention relates to a wireless communication system, and more specifically, to a method and an apparatus for transmitting an RS (Reference Signal) from a transmission end. The present invention relates to an RS transmission method and an apparatus therefore, comprising the steps of: confirming RS resources which are defined according to each layer; and transmitting the precoded RS for the layers to a receiving end through a multiple antenna, wherein the RS resource includes a $1^{st}$ index for indicating an RS resource pattern group in which the precoded RS is mapped within a resource block and a $2^{nd}$ index for indicating a code resource for multiplexing the precoded RSs within the RS resource pattern group.

20 Claims, 15 Drawing Sheets

Related U.S. Application Data continuation of application No. 13/264,738, filed as application No. PCT/KR2010/002367 on Apr. 15, 2010, now Pat. No. 8,743,807.

(60) Provisional application No. 61/169,697, filed on Apr. 15, 2009, provisional application No. 61/173,199, filed on Apr. 27, 2009, provisional application No. 61/173,220, filed on Apr. 28, 2009, provisional application No. 61/223,063, filed on Jul. 6, 2009, provisional application No. 61/233,124, filed on Aug. 11, 2009.

(51) Int. Cl.
| | |
|---|---|
| *H04B 7/06* | (2006.01) |
| *H04L 1/00* | (2006.01) |
| *H04W 40/24* | (2009.01) |
| *H04W 72/04* | (2009.01) |
| *H04L 5/00* | (2006.01) |
| *H04J 13/00* | (2011.01) |
| *H04L 27/26* | (2006.01) |

(52) U.S. Cl.
CPC ............ *H04J13/004* (2013.01); *H04L 1/0027* (2013.01); *H04L 5/0048* (2013.01); *H04L 27/2627* (2013.01); *H04L 27/2653* (2013.01); *H04W 40/244* (2013.01); *H04W 72/04* (2013.01); *H04W 72/042* (2013.01)

(56) References Cited

OTHER PUBLICATIONS

Fujitsu, "DL Reference Signal Design for 8x8 MIMO in LTE-Advanced", 3GPP TSG-RAN1 #56, R1-090706, Feb. 2009.

Nortel, "Performance evaluation of multiple stream DRS design," R1-091385, 3GPP TSG-RAN Working Group 1 Meeting #56, Mar. 2009, 5 pages.

Samsung, "Discussion on DM-RS for LTE-Advanced," R1-092205, 3GPP TSG RAN WG1 #57, May 2009, 6 pages.

CMCC, "Discussions on DM-RS for LTE-A," R1-092189, 3GPP TSG RAN WG1 meeting #57, May 2009, 4 pages.

CMCC, "Discussions on DM-RS Design with Rank Grouping," R1-092823, 3GPP TSG RAN WG1 Meeting #57bis, Jun. 2009, 4 pages.

LG Electronics, "DL DM-RS Design on Extended CP for LTE-Advanced," R1-102375, 3GPP TSG RAN WG1 Meeting #60bis, Apr. 2010, 3 pages.

LG Electronics, "Remaining issues for DL DM-RS Design," 3GPP TSG RAN WG1 Meeting #60, R1-101233, Feb. 2010, 5 pages.

Nokia, et al., "Further considerations on UE-specific reference symbol multiplexing for LTE-Advanced downlink," 3GPP TSG RAN WG1 Meeting #57, R1-091757, May 2009, 6 pages.

Nokia, et al., "UE-specific reference symbol multiplexing for LTE-Advanced downlink," 3GPP TSG RAN WG1 Meeting #56-bis, R1-091352, Mar. 2009, 7 pages.

(a) normal CP  (b) extended CP

FIG. 7
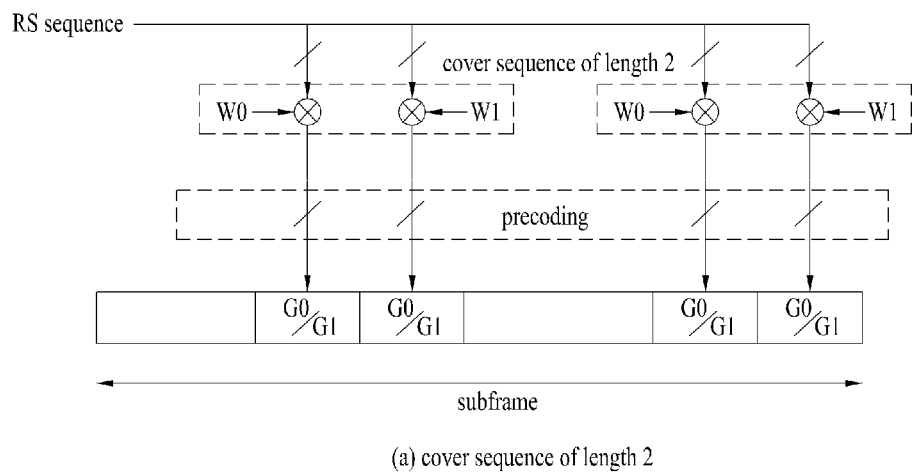
(a) cover sequence of length 2
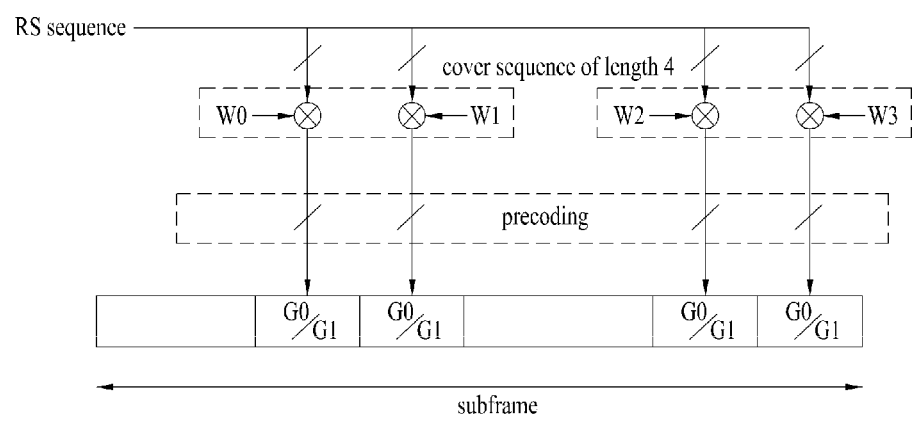
(b) cover sequence of length 4

CW : codeword
S/P: S/P converter

CW : codeword
S/P: S/P converter

CW : codeword
S/P: S/P converter

METHOD AND APPARATUS FOR TRANSMITTING REFERENCE SIGNAL

CROSS-REFERENCE TO RELATED APPLICATIONS

This application is a continuation of U.S. patent application Ser. No. 14/254,602, filed on Apr. 16, 2014, now U.S. Pat. No. 9,014,127, which is a continuation of U.S. patent application Ser. No. 13/264,738, filed on Oct. 14, 2011, now U.S. Pat. No. 8,743,807, which is the National Stage filing under 35 U.S.C. 371 of International Application No. PCT/KR2010/002367, filed on Apr. 15, 2010, which claims the benefit of U.S. Provisional Application Nos. 61/233,124, filed on Aug. 11, 2009, 61/223,063, filed on Jul. 6, 2009, 61/173,220, filed on Apr. 28, 2009, 61/173,199, filed on Apr. 27, 2009, and 61/169,697, filed on Apr. 15, 2009, the contents of which are all hereby incorporated by reference herein in their entirety.

FIELD OF THE INVENTION

The present invention relates to a wireless communication system, and more particularly to a method and apparatus for transmitting a reference signal (RS) using multiple antennas.

BACKGROUND ART

A wireless communication system has been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used, for example, a Code Division Multiple Access (CDMA) system, a Frequency Division Multiple Access (FDMA) system, a Time Division Multiple Access (TDMA) system an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like. In a mobile communication system, a user equipment (UE) may receive information from a base station (BS) via a downlink, and may transmit information to the base station (BS) via an uplink. The information that is transmitted and received to and from the UE includes data and a variety of control information. A variety of physical channels are used according to categories and usages of transmission (Tx) and reception (Rx) information of the UE.

A Multiple Input Multiple Output (MIMO) scheme increases system capacity by simultaneously transmitting multiple data streams (or layers) spatially using two or more transmission/reception (Tx/Rx) antennas in a base station (BS) and a user equipment (UE). The MIMO scheme may include a transmission (Tx) diversity scheme, a spatial multiplexing scheme and a beamforming scheme.

A transmit diversity scheme transmits the same data through multiple transmit (Tx) antennas, such that it can implement reliable data transmission without receiving channel-related feedback information from a receiver. A beamforming scheme is used to increase a signal to interference plus noise ratio (SINR) of a receiver by multiplying weighting values by multiple Tx antennas. In general, since a frequency division duplex (FDD) system has independent uplink (UL) and downlink (DL) channels, high reliability channel information is required to obtain a proper beamforming gain and therefore additional feedback information received from the receiver is used.

On the other hand, a spatial multiplexing scheme for a single user and for multiple users will be described in brief. Spatial multiplexing for a single user is called SM or single user MIMO (SU-MIMO), and assigns several antenna resources of a base station (BS) to one UE. The capacity of a MIMO channel increases in proportion to the number of antennas. Meanwhile, spatial multiplexing for multiple users is called spatial division multiple access (SDMA) or multi-user (MU)-MIMO and distributes several antenna resources or radio space resources of a base station (BS) to a plurality of UEs.

A MIMO scheme includes a single codeword (SCW) method which simultaneously transmits N data streams (or N layers) using one channel encoding block and a multiple codeword (MCW) method which transmits N data streams using M (where M is equal to or less than N (where M≤N)) channel encoding blocks. Each channel encoding block generates independent codewords and each codeword is designed to be able to independently detect errors.

DETAILED DESCRIPTION OF THE INVENTION

Technical Problem

An object of the present invention devised to solve the problem lies on a method and apparatus for transmitting a reference signal (RS) in a wireless communication system. Another object of the present invention devised to solve the problem lies on a method and apparatus for transmitting a reference signal (RS) in a MIMO system. A further object of the present invention devised to solve the problem lies on a method and apparatus for multiplexing and transmitting a reference signal (RS).

It is to be understood that technical objects to be achieved by the present invention are not limited to the aforementioned technical objects and other technical objects which are not mentioned will be apparent from the following description to the person with an ordinary skill in the art to which the present invention pertains.

Technical Solution

The object of the present invention can be achieved by providing a method for transmitting a reference signal (RS) by a transmitter in a wireless communication system, the method including: confirming a reference signal (RS) resource which is defined according to each layer; and transmitting precoded RSs for the layers to a receiver through multiple antennas, using the RS resource, wherein the RS resource includes a first index indicating an RS resource pattern group in which the precoded RS is mapped within a resource block, and a second index indicating a code resource for multiplexing the precoded RSs within the RS resource pattern group.

In another aspect of the present invention, a base station (BS) for transmitting a reference signal (RS) includes a radio frequency (RF) unit configured to transmit/receive an RF signal to/from a user equipment (UE); a memory for storing information transmitted/received to/from the user equipment (UE) and parameters needed to operate the base station (BS); a processor connected to the RF unit and the memory so as to control the RF unit and the memory. The processor includes confirming a reference signal (RS) resource which is defined according to each layer, and transmitting precoded RSs for the layers to a receiver through multiple antennas, using the RS resource, wherein the RS resource includes a first index indicating an RS resource pattern group in which the precoded RS is mapped within a resource block, and a second index indicating a code resource for multiplexing the precoded RSs within the RS resource pattern group.

In another aspect of the present invention, a method for processing a reference signal (RS) by a receiver in a wireless communication system includes confirming a reference signal (RS) resource which is defined according to each layer; receiving precoded RSs for the layers from a transmitter through multiple antennas; and detecting the precoded RSs using the RS resource, wherein the RS resource includes a first index indicating an RS resource pattern group in which the precoded RS is mapped within a resource block, and a second index indicating a code resource for multiplexing the precoded RSs within the RS resource pattern group.

In yet another aspect of the present invention, a user equipment (UE) for processing a reference signal (RS) includes a radio frequency (RF) unit configured to transmit/receive an RF signal to/from a base station (BS); a memory for storing information transmitted/received to/from the user equipment (UE) and parameters needed to operate the base station (BS); a processor connected to the RF unit and the memory so as to control the RF unit and the memory. The processor includes confirming a reference signal (RS) resource which is defined according to each layer; receiving precoded RSs for the layers from a transmitter through multiple antennas; and detecting the precoded RSs using the RS resource, wherein the RS resource includes a first index indicating an RS resource pattern group in which the precoded RS is mapped within a resource block, and a second index indicating a code resource for multiplexing the precoded RSs within the RS resource pattern group.

Each RS resource pattern group may be defined in two contiguous orthogonal frequency division multiplexing (OFDM) symbols located at each slot of the resource block according to an FDM (frequency division multiplexing) scheme, and each RS resource pattern group may include a plurality of resource element pairs temporally contiguous to each other.

The resource pattern indicated by the first index may be represented by the following table:

TABLE

|  | Slot 0 | | Slot 1 | |
| --- | --- | --- | --- | --- |
|  | l = 5 | L = 6 | l = 5 | l = 6 |
| k = 11 | G0 | G0 | G0 | G0 |
| k = 10 | G1 | G1 | G1 | G1 |
| k = 6 | G0 | G0 | G0 | G0 |
| k = 5 | G1 | G1 | G1 | G1 |
| k = 1 | G0 | G0 | G0 | G0 |
| k = 0 | G1 | G1 | G1 | G1 |

In Table, the resource block includes (12 subcarriers×14 OFDM symbols), l is an integer of 0 or higher indicating an OFDM symbol index, k is an integer of 0 or higher indicating a subcarrier index, a slot includes 7 OFDM symbols, G0 indicates RS resource pattern group #0, and G1 indicates RS resource pattern group #1.

The second index may indicate a code resource used as a cover sequence for the precoded RS in a time domain.

The mapping relationship between the RS resource and a layer index or associated value may be based on a $1^{st}$ index first scheme.

The mapping relationship between the RS resource and a layer index or associated value may be based on a $1^{st}$ index first scheme when a rank value is less than a specific value, and may be based on a $2^{nd}$ index first scheme when the rank value is equal to or higher than the specific value.

The RS may include a dedicated reference signal (DRS), and a mapping relationship between a DRS resource and a layer index may be represented by the following table:

TABLE

[Proposal #1.1-G]

| Layer index | DRS pattern group index | Code resource index (opt. 1) | Code resource index (opt. 2) |
| --- | --- | --- | --- |
| 0 | 0 | 0 | 0 |
| 1 | 0 | 1 | 1 |
| 2 | 1 | 2 | 0 |
| 3 | 1 | 3 | 1 |
| 4 | 0 | 4 | 2 |
| 5 | 1 | 5 | 2 |
| 6 | 0 | 6 | 3 |
| 7 | 1 | 7 | 3 |

In Table, the layer index is reordered.

For example, although the entire technology of the present invention has disclosed the mapping relationship of resources basically defined as a DRS pattern group and code of a layer, the scope or spirit of the present invention is not limited thereto. In another example, the inventive technology of the present invention can also be applied to the mapping relationship of resources defined as a DRS pattern group and code index of a virtual antenna port or RS port instead of the layer as necessary. In the latter example, a layer and a layer index to be described in the following embodiments may be converted into a virtual antenna port or RS port and a virtual antenna port index or RS port index, respectively.

Effects of the Invention

As apparent from the above description, exemplary embodiments of the present invention have the following effects. The exemplary embodiments can effectively transmit a reference signal (RS) in a wireless communication system. In addition, the exemplary embodiments can effectively multiplex/transmit a reference signal (RS).

It will be appreciated by persons skilled in the art that that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention. In the drawings:

FIG. 7 exemplarily shows RS transmission channels according to one embodiment of the present invention;

BEST MODE FOR CARRYING OUT THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, a Global System for Mobile communications (GSM), a General Packet Radio Service (GPRS), an Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of a Universal Mobile Telecommunications System (UMTS). 3rd Generation Partnership Project (3GPP) Long Term Evolution (LTE) is a part of an Evolved UMTS (E-UMTS) that uses an E-UTRA. The LTE-Advanced (LTE-A) is an evolved version of 3GPP LTE.

Although the following embodiments of the present invention will hereinafter describe inventive technical characteristics on the basis of the 3GPP system, it should be noted that the following embodiments will be disclosed only for illustrative purposes and the scope and spirit of the present invention are not limited thereto.

Although the following embodiments of the present invention are focused upon the LTE-A system, the conceptual reference signal design or various schemes proposed by the present invention, and associated embodiments may also be applied to other OFDM-based systems.

Although the reference signal patterns proposed by the present invention are focused upon a MIMO condition in which 8 Tx antennas are used in a downlink of the LTE-A system, the proposed RS patterns may be applied to beamforming or downlink (DL) coordinated multiple point (COMP) transmission, and may also be applied to the above-mentioned UL transmission.

For convenience of description, although the exemplary embodiments of the present invention are focused upon a Dedicated Reference Signal (DRS), a Demodulation Reference Signal (DM-RS) or a UE-specific Reference Signal (UE-specific RS), it should be noted that the exemplary embodiments may also be easily applied not only to other reference signals such as a common reference signal (CRS) but also to a cell-specific reference signal (CRS) without departing from the scope or spirit of the present invention.

Figure 1:
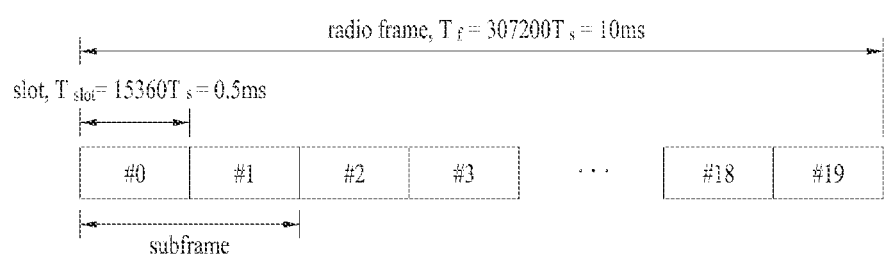
FIG. 1 exemplarily shows a radio frame structure for use in a 3rd Generation Partnership Project Long Term Evolution (3GPP LTE) system.

FIG. 1 exemplarily shows a radio frame structure for use in a 3rd Generation Partnership Project Long Term Evolution (3GPP LTE) system.

Referring to FIG. 1, the radio frame has a length of 10 ms (327200·Ts) and includes 10 subframes of equal size. Each subframe has a length of 1 ms and includes two slots. In this case, Ts represents sampling time, and is expressed by 'Ts=1/(15 kHz×2048)=3.2552×10−8 (about 33 ns)'. The slot includes a plurality of OFDM symbols in a time domain, and includes a plurality of resource blocks (RBs) in a frequency domain. In the LTE system, one resource block includes twelve (12) subcarriers×seven (or six) OFDM (Orthogonal Frequency Division Multiplexing) symbols. The aforementioned structure of the radio frame is only exemplary, and various modifications can be made to the number of subframes contained in the radio frame or the number of slots contained in each subframe, or the number of OFDM symbols in each slot.

Figure 2:
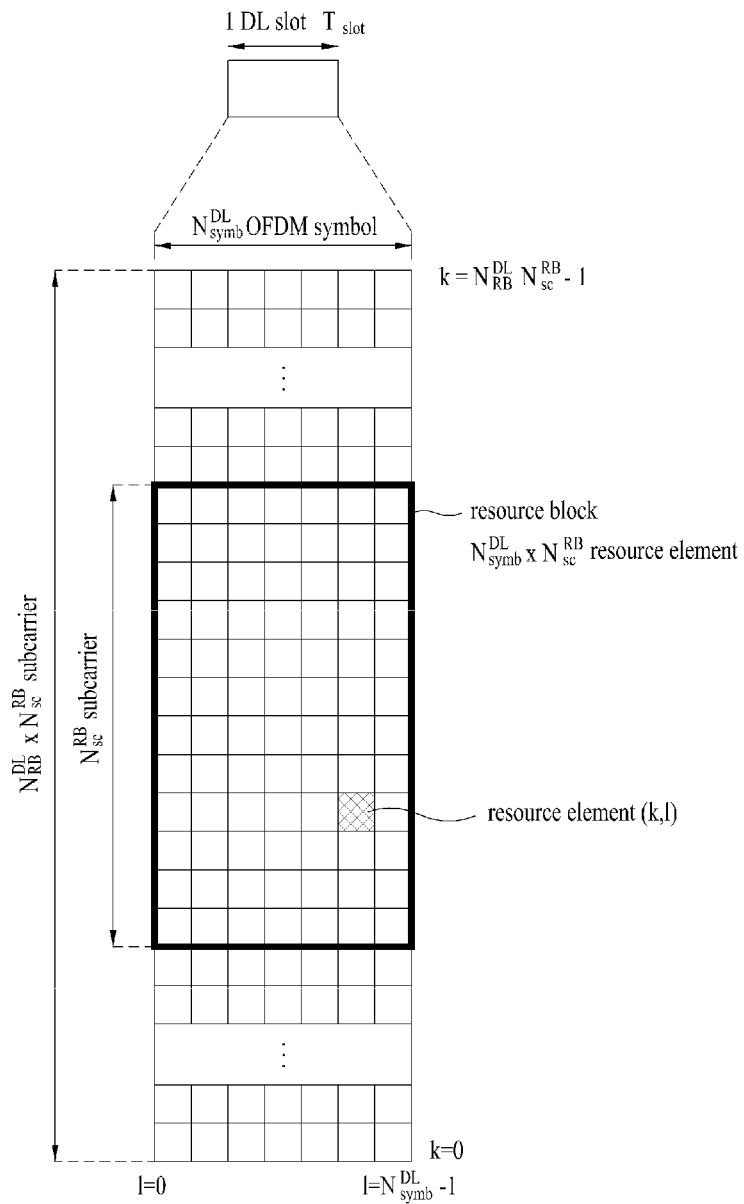
FIG. 2 exemplarily shows a resource grid of a downlink (DL) slot.

FIG. 2 exemplarily shows a resource grid of a downlink (DL) slot.

Referring to FIG. 2, a downlink slot includes a plurality of OFDM symbols in a time domain, and includes a plurality of resource blocks in a frequency domain. Although FIG. 2 illustrates that a downlink slot includes 7 OFDM symbols and a resource block (RB) includes 12 subcarriers, the scope or spirit of the present invention is not limited thereto and other examples can also be applied to the present invention. For example, the number of OFDM symbols contained in a DL slot may be changed according to a Cyclic Prefix (CP) length. Each element on a resource grid may be defined as a resource element (RE). One RB may include (12×7 (or 6)) resource elements (REs). The number NDL of RBs contained in a DL slot is dependent upon a downlink transmission bandwidth established in a cell.

In the LTE system, a Layer 1 (L1)/Layer 2 (L2) control region and a data region are multiplexed in Time Division Multiplexing (TDM) in a DL subframe. The L1/L2 control region occupies the first to third OFDM symbols of the DL subframe, and the data region occupies the remaining OFDM symbols of the DL subframe. The L1/L2 control region includes a Physical Downlink Control CHannel (PDCCH) for carrying DL control information and the data region includes a Physical Downlink Shared CHannel (PDSCH) acting as a downlink data channel. To receive a DL signal, a UE reads DL scheduling information from the PDCCH. Then the UE receives DL data on the PDSCH based on resource allocation information indicated by the DL scheduling information. Resources scheduled for the UE (i.e. the PDSCH) are allocated on an RB basis or on an RB group basis.

In a wireless communication system, since packets are transmitted through a radio channel, a signal may be distorted during transmission. In order to enable a reception side to correctly receive the distorted signal, distortion of the received signal should be corrected using channel information. In order to detect the channel information, a method of transmitting a signal, of which both the transmission side and the reception side are aware, and detecting channel information using a distortion degree when the signal is received through a channel is mainly used. The above signal is referred to as a pilot signal or a reference signal (RS).

Figure 3:
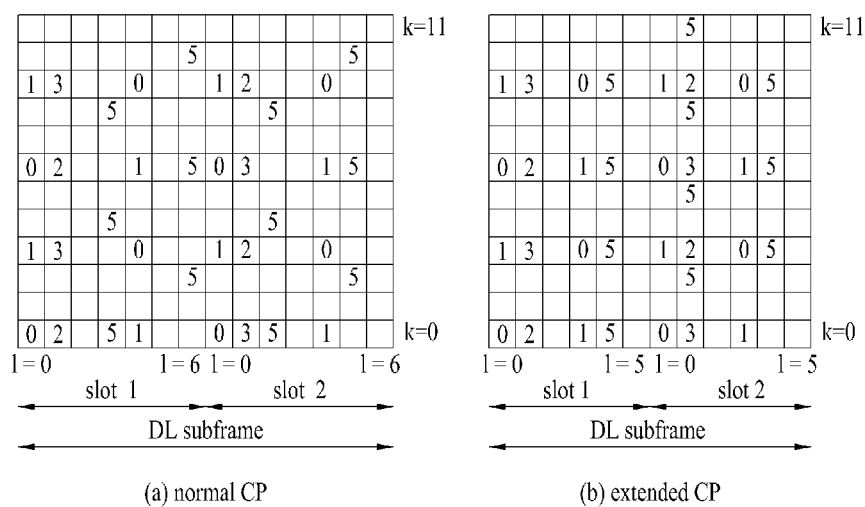
FIG. 3 exemplarily shows a reference signal (RS) pattern defined in the LTE system.

FIG. 3 exemplarily shows a reference signal (RS) pattern defined in the LTE system.

Referring to FIG. 3, the legacy LTE system includes a cell-specific RS (CRS) and a UE-specific RS in a downlink. The cell-specific RS (CRS) is transmitted through all DL subframes. In case of a Multicast Broadcast Single Frequency Network (MBSFN), CRS is transmitted only through the first and second OFDM symbols. CRS is transmitted using at least one of antenna ports 0 to 3. The UE-specific RS supports single antenna port transmission of a PDSCH and is transmitted through the antenna port 5. The UE-specific RS is transmitted only when PDSCH transmission relates to the corresponding antenna port, and is used to demodulate the PDSCH. The UE-specific RS may be transmitted only through a resource block mapped to the corresponding PDSCH. In FIG. 3, the position of an RE mapped to an RS corresponding to the antenna port 0, 3 or 5 is denoted by '0', '3' or '5', respectively. In FIG. 3, 'l' is an OFDM symbol index, and 'k' is a subcarrier index.

Antenna port distinction is not physical distinction. A method for actually mapping each logical antenna index or each virtual antenna index to a physical antenna is implemented in different ways according to individual manufacturing companies. The antenna port is not always matched to the physical antenna on a one to one basis, and one antenna port may correspond to one physical antenna or a combination (i.e., an antenna array) of multiple physical antennas.

The LTE-A system is designed to use a maximum of 8 transmission (Tx) antennas as compared to 4 transmission (Tx) antennas of the LTE system, resulting in an increased throughput. In order to reduce RS overhead generated by the increased Tx antennas, a dedicated reference signal (DRS), that may be defined on a UE basis or may be defined on an RB basis in a frequency domain assigned to a UE, can be used. DRS may be explicitly defined as a UE-specific demodulation reference signal (DM-RS). The DRS proposed in the present invention may be precoded. In this case, as many orthogonal patterns as the number of ranks (layers or transmission streams) may be used. Needless to say, the DRS proposed by the present invention may not be precoded. For convenience of description, the precoded DRS and the layer reference signal (RS) may be used interchangeably.

The reference signal (RS) of LTE antenna port 5 shown in FIG. 3 may be used as a dedicated reference signal (DRS), such that backward and forward compatibility with the LTE system can be supported, efforts on the standard can be minimized, a common reference signal (RS) is defined and reused in various kinds of antenna technologies.

In order to support a maximum rank-8 in the LTE-A system designed to use 8 transmission (Tx) antennas, 8 different DRS patterns need to be supported. However, although the precoding scheme may be used on one antenna port-5 RS patterns or CDM, FDM, TDM or a combination thereof may be applied to a reference signal (RS) sequence, a sufficient number of different DRS patterns (e.g., a maximum of 8 DRS patterns) may not be defined.

In order to solve the above-mentioned problems, another one dedicated RS (DRS) pattern discriminated in time-frequency resources can be generated. In this case, an RS pattern discriminated in time-frequency resources may be defined as a separate antenna port.

A reference signal (RS) pattern of the legacy antenna port 5 or another RS pattern different from the RS pattern is referred to as DRS pattern group #0, and still another RS pattern defined to be discriminated in time-frequency resources is referred to as DRS pattern group #1. In case of the RS pattern of DRS pattern group #1, the same pattern as the RS pattern of the DRS pattern group #0 may be shifted at the level(s) of a transmission symbol and/or a frequency subcarrier (i.e., RE).

Figure 4:
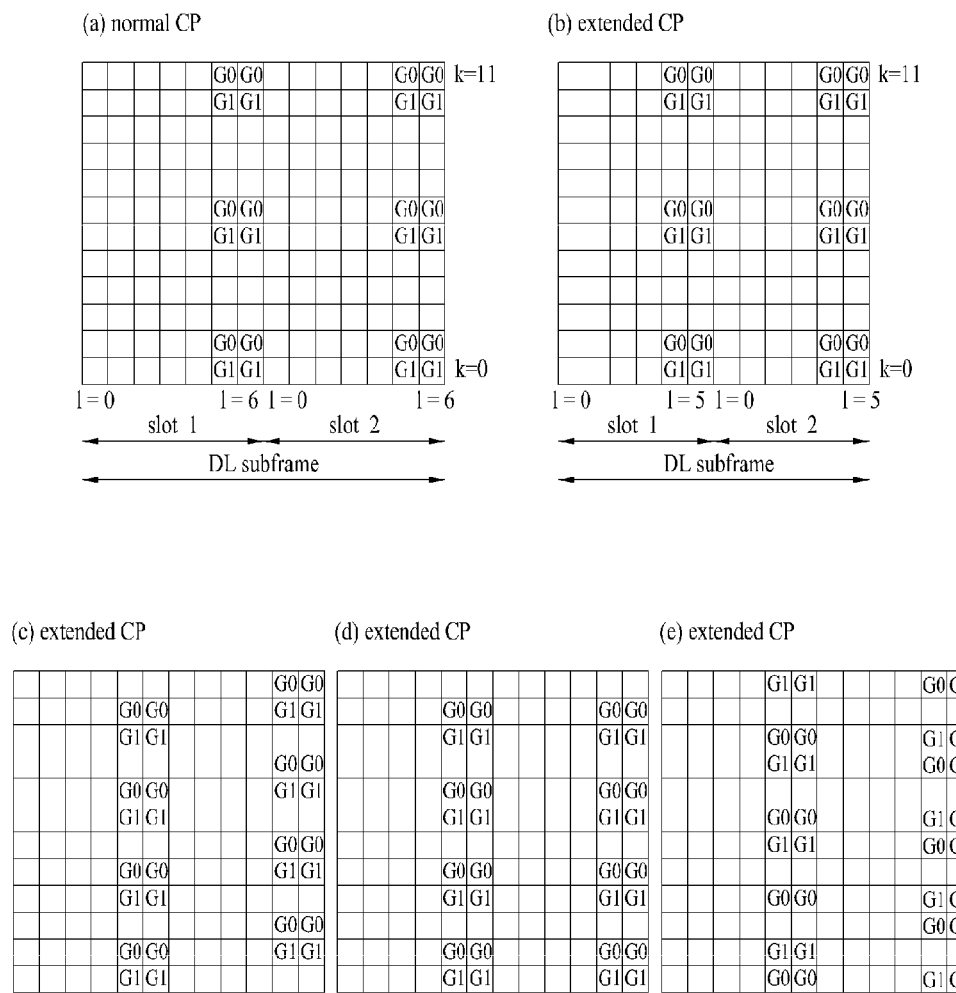
FIG. 4 exemplarily shows an RS pattern group according to one embodiment of the present invention.

FIG. 4 exemplarily shows an RS pattern group according to one embodiment of the present invention.

Referring to FIG. 4, DRS pattern group #0 (G0) and DRS pattern group #1 (G1) may be designed in various ways within one resource block (RB). FIG. 4(a) exemplarily shows one DRS pattern group in case of a normal CP, and FIGS. 4(b) to 4(e) exemplarily show four DRS pattern groups in case of the extended CP. Table 1 briefly shows the matrix-format mapping position of a DRS pattern group in a resource block (RB) including (12 subcarriers×7 OFDM symbols) in case of a normal CP (See FIG. 4(a)). Table 2 briefly shows the matrix-format mapping position of a DRS pattern group in a resource block (RB) including (12 subcarriers×6 OFDM symbols) in case of the extended CP (See FIG. 4(b)). The DRS pattern groups shown in FIGS. 4(c) to 4(e) may be displayed in a matrix form corresponding to the resource block (RB) as shown in Table 2.

TABLE 1

|  | Slot 0 | | Slot 1 | |
| --- | --- | --- | --- | --- |
|  | l = 5 | L = 6 | l = 5 | l = 6 |
| k = 11 | G0 | G0 | G0 | G0 |
| k = 10 | G1 | G1 | G1 | G1 |
| k = 6 | G0 | G0 | G0 | G0 |
| k = 5 | G1 | G1 | G1 | G1 |
| k = 1 | G0 | G0 | G0 | G0 |
| k = 0 | G1 | G1 | G1 | G1 |

TABLE 2

|  | Slot 0 | | Slot 1 | |
| --- | --- | --- | --- | --- |
|  | l = 4 | l = 5 | l = 4 | l = 5 |
| k = 11 | G0 | G0 | G0 | G0 |
| k = 10 | G1 | G1 | G1 | G1 |
| k = 6 | G0 | G0 | G0 | G0 |
| k = 5 | G1 | G1 | G1 | G1 |
| k = 1 | G0 | G0 | G0 | G0 |
| k = 0 | G1 | G1 | G1 | G1 |

In Tables 1 and 2, l is an integer of 0 or more indicating an OFDM symbol index, and k is an integer of 0 or more indicating a subcarrier index. In case of a normal CP, the slot includes 7 OFDM symbols. In case of the extended CP, the slot includes 6 OFDM symbols. G0 is a DRS pattern group #0, and G1 is a DRS pattern group #1. For example, each DRS pattern group may multiplex a maximum of 4 layer RSs.

In accordance with another embodiment of the extended CP, differently from FIG. 4(b) illustrating resource elements (REs) each including 12 RS transmission subcarriers and Table 2, DRS pattern group #0 and DRS pattern group #1, each of which is comprised of the increased number of RS transmission subcarriers, may be used to implement more correct channel estimation under more frequency-selective channel condition. For example, each DRS pattern group may be comprised of 16 RS transmission REs.

Provided that the number of orthogonal DRS patterns to be identified in response to an arbitrary rank value or the number (=Rank value) of virtual antenna ports to be supported by the LTE-A is set to N (N is an integer of 1 or higher, for example, 1≤N≤8), M distinctive DRS patterns (where 1≤M≤N) are multiplexed through DRS pattern group #0 (G0), and (N−M) distinctive DRS patterns are multiplexed through DRS pattern group #1 (G1). If there are no distinctive DRS patterns applied to a system in an arbitrary DRS pattern group according to the multiplexed condition, DRS pattern group #0 (G0) is not defined in a resource block (RB) in case of M=0 and DRS pattern group #1 (G1) is not defined in a resource block (RB) in case of M=N. In the present invention, a virtual antenna port may be referred to as an antenna RS port in view of an RS. The antenna RS port may have a logical antenna index or virtual antenna index of RS resources. In this case, RS resources may be mapped to an antenna RS port of a specific index region.

For example, although the entire technology of the present invention has disclosed the mapping relationship of resources basically defined as a DRS pattern group and code of a layer, the scope or spirit of the present invention is not limited thereto. In another example, the inventive technology of the present invention can also be applied to the mapping relationship of resources defined as a DRS pattern group and code index of a virtual antenna port or RS port instead of the layer as necessary. In the latter example, a layer and a layer index to be described in the following embodiments may be converted into a virtual antenna port or RS port and a virtual antenna port index or RS port index, respectively.

In FIG. 4, it is assumed that each of the number (A) of REs of DRS pattern group #0 and the number (B) of REs of the DRS pattern group #1 is set to 12. However, the assumption of FIG. 4 is disclosed only for illustrative purposes. In the present embodiments, although the number (A) of REs contained in DRS pattern group #0 is basically defined to be equal to the number (B) of REs contained in DRS pattern group #1 according to the system design purpose, it can be recognized that A may also be different from B on the basis of the importance of each layer RS pattern or layer in response to the arbitrary rank value. In addition, as described above, the number of DRS pattern groups, each of which is comprised of fixed REs based on a specific rank value according to transmission rank setup, may be changed. For example, in case of the entire DRS pattern considering total overhead, if a rank is set to any value of 1~2, one DRS pattern group is applied to Rank 1 or 2, each RB includes 12 RS REs. If Rank is set to any value of 3~8, two DRS pattern groups are applied to the Rank such that a total of 24 RS REs may be contained in each RB.

Each DRS pattern group may be mapped to a separate (virtual) antenna port. For example, if DRS pattern group #0 satisfies an RS pattern of the antenna port 5 without any change, the DRS pattern group #0 is set to the antenna port 5, and an RS pattern of the DRS pattern group #1 may be set to a separate antenna port (e.g., antenna port 6). In addition, definition of antenna ports are departmentalized such that individual RS resources (patterns) pertaining to the RS pattern group may be defined as a separate antenna port. For example, in the case where two RS resources (patterns) are mapped to RS pattern group #0 and two RS resources (patterns) are mapped to RS pattern group #1, four (virtual) antenna ports or RS ports may be respectively mapped and defined.

Hereinafter, the present invention proposes a method for mapping (or multiplexing) orthogonal or quasi-orthogonal RS patterns of a total of C layers on the basis of an arbitrary rank value C that is designated for the corresponding downlink MIMO transmission through DRS pattern group #0 comprised of A (e.g., 12) REs (e.g., subcarriers acting as REs) specified in a time domain (e.g., on an OFDM symbol basis) and a frequency domain (e.g., on a subcarrier basis) and DRS pattern group #1 comprised of B REs (e.g., 12 REs). Although numbers A and B of RS REs for each DRS pattern group are basically identical to each other to provide uniform channel estimation performance, the numbers A and B may also be different from each other on the basis of the importance of a specific DRS pattern group or a DRS resource or layer.

The mapping or multiplexing scheme of DRS resources of the layer (or RS port) according to the present invention is based on the scheme design in which RS resources (RS patterns) mapped to individual layers are unchanged in response to an arbitrary rank value. In order to provide an RS pattern that is capable of being applied to Single User MIMO (SU-MIMO), Multi User MIMO (MU-MIMO), and DL CoMP, the RS position and pattern for each layer should be unchanged. The above-mentioned concept may be represented by 'rank-independent one-to-one layer-to -RS resource mapping'. In addition, according to the aforementioned distinctive mapping targets, the above-mentioned concept may also be represented by 'rank-independent one-to-one RS port-to-RS resource mapping'.

To accomplish this, for an arbitrary transmission rank value (Z), Z RS resources (or Z RS patterns) may be selected in a fixed order according to available rank values, from among RS resources (RS patterns) mapped to each transmission layer defined by the layer index described in the present invention. For example, provided that a transmission rank value is set to 'Z', RS resources (patterns) for Z layer indexes may be sequentially applied from Layer index #0 to Layer index #(Z−1).

FDM or CDM may be used as a basic method for multiplexing one or more layer RS resources (patterns) on A or B RS REs of each DRS pattern group. If necessary, TDM may be further used according to the details design result of each DRS pattern. Needless to say, detailed multiplexing schemes, each of which is a combination of two or more schemes from among the above-mentioned multiplexing schemes may also be contained in the proposal of the present invention.

A method for multiplexing D RS REs according to individual DRS pattern groups on the assumption that the sum of A RS REs and B RE REs for each DRS pattern group is set to D is based on a method for multiplexing physical resource REs to be discriminated among TDM, FDM or FDM/TDM. If necessary, CDM may be used to multiplex RS physical resources among DRS patter groups.

Under the condition that each DRS pattern group #0 or #1 includes A (e.g., 12) REs or B (e.g., 12) REs, a detailed description of the exemplary case in which RS patterns of layers formed according to an arbitrary rank value are CDM-processed in REs of the selected DRS pattern group will hereinafter be described in detail.

Code resources, that are capable of being applied to define individual DRS resources (patterns) for RS REs of an arbitrary DRS pattern group according to the CDM, may include Orthogonal Variable Spreading Factor (OVSF) code, Discrete Fourier Transform (DFT)-based code, a Walsh- or Walsh-Hadamard-based orthogonal code sequence. In addition, such code resources may include cyclic shifts of a CAZAC-based Generalized Chirp Like (GCL) sequence, Computer Generated CAZAC (CG-CAZAC) or Zadoff-Chu (ZC), and Zadoff-Chu zero correlation zone (ZC-ZCZ) sequence. In addition, the code resources may include cyclic shifts of a quasi-orthogonal-based cold code sequence, and Kasami sequence, m-sequence binaries. Such code resources may be one-dimensionally applied only to a time domain or a frequency domain in association with RS REs of each DRS pattern group, and may also be two-dimensionally applied to both of the time domain and the frequency domain. Such code resources may be used as cover sequences in a time domain and/or frequency domain in association with RS REs of each DRS pattern group.

In case of applying the above-mentioned arbitrary code sequence to each DRS pattern group or all the DRS pattern groups, the arbitrary code sequence may be applied to REs of a frequency domain of an OFDM symbol including the corresponding RS RE, or may also be mapped to RS REs of all the RS REs (on one or more DRS pattern groups).

Figure 5:
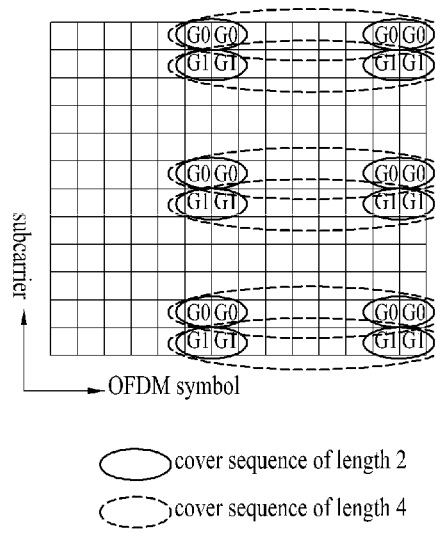
FIGS. 5 and 6 are a conceptual diagram illustrating a method for multiplexing an RS signal in an RS pattern group according to one embodiment of the present invention.
Figure 6:
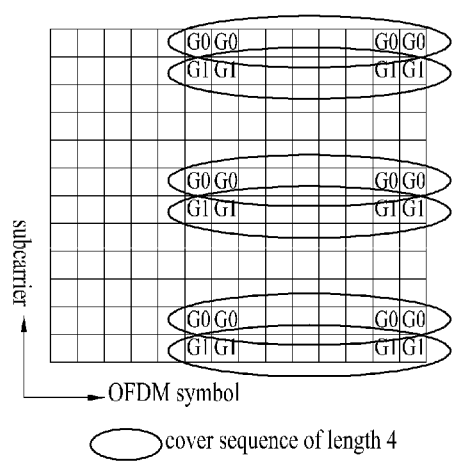

FIGS. 5 and 6 illustrate the examples for multiplexing DRS resources mapped to a DRS pattern group using the CDM scheme according to one embodiment of the present invention. FIG. 5 shows the exemplary case in which a cover sequence is used on a slot basis. For this purpose, a cover sequence of the length 2 may be used (as denoted by a solid line). Application of the cover sequence of the length 2 for each slot may be interpreted as application of the cover sequence of the length 4 in terms of a subframe (as denoted by a dotted line). For example, assuming that [1 −1] is applied to each of slot 0 and slot 1, [1 −1 1 −1] may be interpreted as being applied to the subframe. FIG. 6 shows the exemplary case in which the cover sequence is used in units of a subframe. In order to implement the example of FIG. 6, the separately-defined cover sequence of the length 4 may be used as necessary. Tables 3 and 4 illustrate exemplary cases where the cover sequence of the length 2 and the cover sequence of the length 4 may be applied to DRS pattern group G0 and DRS pattern group G1, respectively.

TABLE 3

| | Slot 0 | | Slot 1 | |
|---|---|---|---|---|
| | l = 5 | l = 6 | l = 5 | l = 6 |
| k = 11 | w0*G0 | w1*G0 | w0'*G0 | w1'*G0 |
| k = 10 | w0*G1 | w1*G1 | w0'*G1 | w1'*G1 |
| k = 6 | w0*G0 | w1*G0 | w0'*G0 | w1'*G0 |
| k = 5 | w0*G1 | w1*G1 | w0'*G1 | w1'*G1 |
| k = 1 | w0*G0 | w1*G0 | w0'*G0 | w1'*G0 |
| k = 0 | w0*G1 | w1*G1 | w0'*G1 | w1'*G1 |

TABLE 4

| | Slot 0 | | Slot 1 | |
|---|---|---|---|---|
| | l = 5 | l = 6 | l = 5 | l = 6 |
| k = 11 | w0*G0 | w1*G0 | w2*G0 | w3*G0 |
| k = 10 | w0*G1 | w1*G1 | w2*G1 | w3*G1 |
| k = 6 | w0*G0 | w1*G0 | w2*G0 | w3*G0 |
| k = 5 | w0*G1 | w1*G1 | w2*G1 | w3*G1 |
| k = 1 | w0*G0 | w1*G0 | w2*G0 | w3*G0 |
| k = 0 | w0*G1 | w1*G1 | w2*G1 | w3*G1 |

In Tables 3 and 4, l, k, slot, G0 and G1 are identical to those of Tables 1 and 2, and w0, w1, w2 and w3 may indicate individual elements of the cover sequence. [w0 w1] and [w0+ w1+] may indicate a cover sequence applied to Slot 0 and a cover sequence applied to Slot 1, respectively. [w0 w1] and [w0+ w1+] may be selected independently from the set of the cover sequence having the length of 2.

From among the orthogonal cover indexes of DRS resources (patterns) defined as CDM of the arbitrary DRS pattern group, some indexes may be defined as an orthogonal cover sequence of the slot unit length 2, and some other indexes may be defined as an orthogonal cover sequence of the subframe unit length 4. Table 5 exemplarily shows the orthogonal cover sequence of the length 4 and the orthogonal cover sequence of the length 2.

TABLE 5

| Sequence index | Orthogonal cover sequence | |
|---|---|---|
| | Length 4: [w0 w1 w2 w3] | Length 2: [w0 w1] |
| 0 | [+1 +1 +1 +1] | [+1 +1] |
| 1 | [+1 −1 +1 −1] | [+1 −1] |
| 2 | [+1 +1 −1 −1] | – |
| 3 | [+1 −1 −1 +1] | – |
| 4 | [+j +j +j +j] | [+j +j] |
| 5 | [+j −j +j −j] | [+j −j] |
| 6 | [+j +j −j −j] | – |
| 7 | [+j −j −j +j] | – |

In Table 5, the sequence index may correspond to the code resource index. However, provided that the cover sequence (i.e., the cover sequence of the length 2) is applied on a slot basis, the code resource index may be independently assigned to each slot and may be assigned to a combination of sequence indexes applied to Slot 0 and Slot 1. For example, one code resource index may be defined for a combination of [w0 w1] and [w0+ w1+]) shown in Table 3.

Table 5 is disclosed only for illustrative purposes, and orthogonal code resources of cyclic shifts of a CAZAC-based GCL (Generalized Chirp Like) sequence and CG-CAZAC or Zadoff-Chu sequence. In addition, cyclic shifts of quasi-orthogonal-based gold code sequence, Kasami sequence, and m-sequence binaries may be used as code resources for covering.

Although not shown in FIGS. 5 and 6, scrambling may be applied to the DRS pattern group in the frequency or time-frequency domain, in addition to apply a cover sequence of a time domain to the DRS pattern. Scrambling may be applied to a DRS pattern group on an OFDM symbol basis, or may also be applied to all the RS REs pertaining to the DRS pattern group. The scrambling may be UE-specifically, UE-group-specifically, or cell-specifically applied. Orthogonal Variable Spreading Factor (OVSF) code, Discrete Fourier Transform (DFT)-based code, Walsh- or Walsh-Hadamard-based orthogonal code sequences may be used as scrambling code sequences. In addition, cyclic shifts (CSs) of CAZAC-based GCL sequence, CG-CAZAC, Zadoff-Chu (ZC) sequence, and Zadoff-Chu zero correlation zone (ZC-ZCZ) may be used as scrambling code sequences. In addition, cyclic shifts (CSs) of quasi-orthogonal-based gold code sequence or Kasami sequence, and m-sequence (binary) may also be used as scrambling code sequences. Code sequences for such scrambling are not defined as code resources for discriminating orthogonal DRS resources of the arbitrary DRS pattern group based on the CDM scheme according to usage purposes. That is, the code sequence for discriminating CDM code resources and the scrambling code sequence may be individual defined and applied.

FIG. 7 exemplarily shows the physical channel structure for DRS transmission according to one embodiment of the present invention.

Referring to FIG. 7, each slot includes a symbol for data transmission and a symbol (G0/G1) for DRS. In G0/G1 symbols, frequency resources mapped to DRS pattern group #0 (G0) and frequency resources mapped to DRS pattern group #1 (G1) may be multiplexed according to the FDM scheme as shown in FIG. 4. In the embodiment, it is possible to use another method different from the resource mapping method of an orthogonal code sequence constructing an orthogonal DRS resource (pattern) in the CDM-based DRS pattern group. The length of a code sequence, that is applied to RS REs of the arbitrary DRS pattern group so as to define the CDM-based orthogonal DRS resource (pattern), may be defined to be identical to the number of RS REs contained in the corresponding DRS pattern group. For example, if the number of REs of a DRS pattern group is set to 12, the length of a sequence for each RS may be set to 12 in response to 12 REs of the DRS pattern group. In this case, the sequence for the RS may be mapped to all the RS REs contained in the DRS pattern group. On the other hand, the length of a sequence for the RS may be identical to the number of RS REs contained in each OFDM symbol of the DRS pattern group. In this case, one RS sequence may be mapped only to RS RE contained in the OFDM symbol, and the same RS sequence may be repeatedly mapped to OFDM symbols of the DRS pattern group.

In each DRS pattern group, several DRS resources (patterns) may be CDM-processed in a time domain and/or a frequency domain. For example, the CDM scheme may be implemented using a (quasi)-orthogonal code (i.e., a cover sequence) for time spread. Code resources for CDM may include orthogonal codes (for example, OVSF code, Walsh code, Walsh-Hadamard code, and DFT code). Code resources for CDM may include cyclic shifts of CAZAC GCL sequence, CG-CAZAC sequence, ZC sequence, and ZC-ZCZ. In addition, code resources for CDM may include cyclic shifts (CSs) of quasi-orthogonal-based gold code sequence, Kasami sequence, and m-sequence binaries. The cover sequence multiplied by an RS sequence may be applied on a slot basis or a subframe basis. If the cover sequence is applied on a slot basis, the cover sequence (w0, w1) of the length 2 may be used as shown in FIG. 7(a). If the cover sequence is applied on a subframe basis, the cover sequence (w0, w1, w2, w3) of the length 4 may be used as shown in FIG. 7(b). If DRS is not precoded, RS sequence is multiplied by a cover sequence in a time domain, and is then mapped to physical resources for each physical antenna. On the other hand, if the DRS is precoded (i.e., layer RS), the cover sequence is multiplied by DRS REs in a time domain, and the DRS REs may be mapped to physical resources for each physical antenna through precoding.

Figure 8:
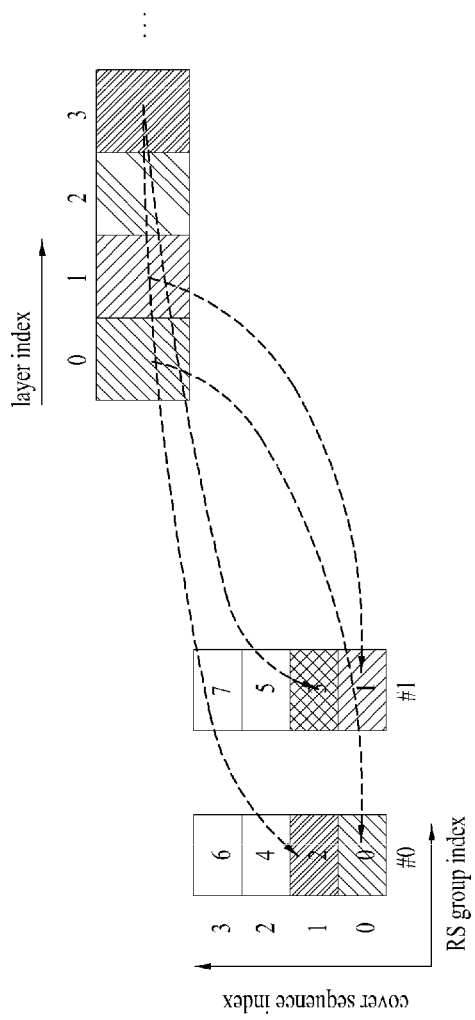
FIG. 8 exemplarily shows the mapping relationship between an RS resource and a layer index according to one embodiment of the present invention.

FIG. 8 shows exemplary allocation of DRS resources (patterns) according to one embodiment of the present invention. DRS resources according to the present invention may be specified by an index pair including a DRS pattern group and a code resource index. For convenience of description, the present embodiment assumes the precoded DRS (i.e., layer RS). If DRS is not precoded, layer index shown in FIG. 8 may be replaced with an object (e.g., a physical antenna port) corresponding to the physical antenna. The scope or spirit of the present invention is not limited thereto, and it should be noted that a layer index may be replaced with a virtual antenna port, a virtual antenna port index, an RS port, or an RS port index, differently from the above-mentioned layer index described above. For convenience of description, the embodiment of the present invention will be disclosed to cover all the above-mentioned cases for describing the case of a layer index.

Referring to FIG. 8, resources (e.g., DRS pattern group index and code resource index) for layer RS on a DRS to which precoding is applied may be determined using a layer index and associated parameters (e.g., (virtual) antenna port index, antenna port, or RS port). For example, layer index or layer RS index may be mapped to layer RS resources. In another example, layer or layer RS index may be mapped to a (virtual) antenna port, and the (virtual) antenna port may be mapped to layer RS resources. The layer RS index may represent a logical index indicating the order of RSs defined per layer according to the proposal of the present invention, and may correspond to a layer index. The index of the (virtual) antenna port is an index indicating a logical order of either a system defined in the present invention or a transmission mode. If the index of the (virtual) antenna port for another conventional transmission mode is predetermined, a predetermined offset may be applied to index configuration. Considering the sequential mapping of the layer index to the antenna RS port, the mapping between the layer RS and the layer RS resources may be defined to have the same order or format as in the mapping between the antenna RS port and the RS resource. On the other hand, provided that permutation (or reordering) is applied to layer index, layer RS index, and antenna RS port, the mapping order between the RS for each layer and layer RS resources may be changed. In addition, when mapping between the RS for each layer and the layer RS resource, additional parameters (e.g., UE-specific parameter) may be used (for example, as a cyclic offset).

Although not shown in FIG. 8, when scrambling is additionally applied to the layer RS, a scrambling code resource (index) may be further defined as a layer RS resource. The scrambling code resource (index) may be UE-specifically, UE group-specifically, and cell-specifically defined.

If an arbitrary rank value is given, a DRS pattern group index first mapping scheme, a code resource index first mapping scheme, or a hybrid thereof may be used to map individual layers or (virtual) antenna ports to a DRS pattern. The DRS pattern group index first mapping scheme sequentially maps individual layers or (virtual) antenna ports to DRS pattern group #0 and DRS pattern group #1. If the number of layers or (virtual) antenna ports to be mapped to the DRS pattern groups is insufficient, code resources may be changed in the DRS pattern group. For example, the code resource first mapping scheme may firstly map individual layers or (virtual) antenna ports to DRS patterns of the DRS pattern group #0. If the number of layers or (virtual) antenna ports to be mapped to the DRS patterns is insufficient, code resources are mapped to DRS patterns of the DRS pattern group #1. In addition, a hybrid of the DRS pattern group index first mapping scheme and the code resource index first mapping scheme may be used according to the rank value.

A method for mapping a layer, a layer RS, a virtual antenna port, a virtual antenna port index, an RS port or an RS port index to DRS resources will hereinafter be described with reference to Tables. According to the proposal of the present invention, DRS pattern groups of individual layers are fixed and established irrespective of the rank value. For convenience of description, the following tables exemplarily show the layer index mapped to DRS resources. The following tables are disclosed only for illustrative purposes, the scope or spirit of the present invention is not limited thereto, a layer or a layer index may be converted into a layer RS, a layer RS index, a virtual antenna port, a virtual antenna port index, an RS port or an antenna port index. In more detail, although Tables shown in the present embodiment exemplarily disclose the mapping relationship of resources defined as a DRS pattern group and code of the layer, the scope or spirit of the present invention is not limited thereto, and can also be applied to the mapping relationship of resources defined as a DRS pattern group and code index of the virtual antenna port or RS port, instead of the layer. For example, after layer (or layer RS) may be mapped to DRS resources or an antenna RS port, the antenna RS port may be mapped to the DRS resources. In this case, reordering or permutation may be applied to layer index (layer RS index) and/or the antenna RS port. For example, although layer indexes of the following table is arranged in the order of '0→2→3→4→5→6→7', the layer indexes after execution of the reordering may be rearranged in the order of 0→3→5→7→1→2→4→6. Although the following table exemplarily shows a plurality of ranks up to Rank 8 for convenience of description, the scheme proposed by the present invention may also be equally or similarly extended even to the system having a higher rank value.

In the following example, the number of REs of each DRS pattern group may be set to 12, and the length of a code sequence for RS may also be set to 12. In addition, according to a first method (Method 1), a total of 8 code resources may be defined in different ways according to individual DRS pattern groups. According to a second method (Method 2), a total of 4 code resources (that is, the same code resource for each DRS pattern group may be established) may be defined. In addition, all of the code resource index #0 may be composed of '1'. In more detail, no code may be applied to the case where one layer RS pattern is established in an arbitrary DRS pattern group.

TABLE 6

| Layer index | DRS pattern group index | Code resource index (opt. 1) | Code resource index (opt. 2) |
|---|---|---|---|
| Proposal #1.1-A | | | |
| 0 | 0 | 0 | 0 |
| 1 | 0 | 1 | 1 |
| 2 | 1 | 2 | 0 |
| 3 | 1 | 3 | 1 |
| 4 | 0 | 4 | 2 |
| 5 | 0 | 5 | 3 |
| 6 | 1 | 6 | 2 |
| 7 | 1 | 7 | 3 |
| Proposal #1.1-B | | | |
| 0 | 0 | 0 | 0 |
| 1 | 0 | 1 | 1 |
| 2 | 1 | 2 | 0 |
| 3 | 1 | 3 | 1 |
| 4 | 1 | 4 | 2 |
| 5 | 1 | 5 | 3 |
| 6 | 0 | 6 | 2 |
| 7 | 0 | 7 | 3 |

Proposal 1.1-A exemplarily shows the case where the DRS pattern group is changed whenever the layer index is increased by 2. That is, if the layer index is set to 0~1, only the DRS pattern group #0 is used, and two code resource indexes are used for insufficient resources. Similarly, if the layer index is set to any one of 2~3, 4~5 and 6~7, individual DRS pattern groups #1, #0 and #1 are sequentially applied.

Proposal 1.1-B exemplarily shows modification of the proposal 1.1-A. Proposal 1.1-B may also be interpreted as the case where the layer index is rearranged in the proposal 1.1-A. In more detail, Method 2 of the proposal 1.1-B may correspond to the case where the layer indexes 4, 5, 6 and 7 of Method 2 of the proposal 1.1-A are rearranged in the order of 6→7→4→5.

TABLE 7

| Layer index | DRS pattern group index | Code resource index (opt. 1) | Code resource index (opt. 2) |
|---|---|---|---|
| Proposal #1.1-C | | | |
| 0 | 0 | 0 | 0 |
| 1 | 1 | 1 | 0 |
| 2 | 0 | 2 | 1 |
| 3 | 1 | 3 | 1 |
| 4 | 0 | 4 | 2 |
| 5 | 1 | 5 | 2 |
| 6 | 0 | 6 | 3 |
| 7 | 1 | 7 | 3 |
| Proposal #1.1-D | | | |
| 0 | 0 | 0 | 0 |
| 1 | 1 | 1 | 0 |
| 2 | 1 | 2 | 1 |
| 3 | 0 | 3 | 1 |
| 4 | 1 | 4 | 2 |
| 5 | 0 | 5 | 2 |
| 6 | 1 | 6 | 3 |
| 7 | 0 | 7 | 3 |

Proposal 1.1-C exemplarily shows the DRS pattern group index first mapping scheme. That is, according to the proposal 1.1-C, layer indexes are sequentially mapped to DRS pattern group #0 and DRS pattern group #1. And, if the number of layer indexes is insufficient, code resources are changed in the DRS pattern group.

Proposal 1.1-D exemplarily shows modification of Proposal 1.1-C. In more detail, Proposal 1.1-D exemplarily shows the exemplary usage of a different-format layer (or antenna port)-to -RS resource mapping scheme on the basis of a boundary between layer index 1 and layer index 2.

Proposal 1.1-C and Proposal 1.1-D may also be applied to the case where 24 REs may be applied to the DRS pattern group in case of Rank 2 or higher.

TABLE 8

| Layer index | DRS pattern group index | Code resource index (opt. 1) | Code resource index (opt. 2) |
|---|---|---|---|
| Proposal #1.1-E | | | |
| 0 | 0 | 0 | 0 |
| 1 | 0 | 1 | 1 |
| 2 | 1 | 2 | 0 |
| 3 | 1 | 3 | 1 |
| 4 | 0 | 4 | 2 |
| 5 | 1 | 5 | 3 |
| 6 | 0 | 6 | 2 |
| 7 | 1 | 7 | 3 |
| Proposal #1.1-F | | | |
| 0 | 0 | 0 | 0 |
| 1 | 0 | 1 | 1 |
| 2 | 1 | 2 | 0 |
| 3 | 1 | 3 | 1 |
| 4 | 1 | 4 | 2 |
| 5 | 0 | 5 | 3 |
| 6 | 1 | 6 | 2 |
| 7 | 0 | 7 | 3 |

Proposals 1.1-E and 1.1-F exemplarily show more uniform distribution methods on higher layer RS indexes as compared to Proposals 1.1-N1.1-B.

TABLE 9

| Layer index | DRS pattern group index | Code resource index (opt. 1) | Code resource index (opt. 2) |
|---|---|---|---|
| Proposal #1.1-G | | | |
| 0 | 0 | 0 | 0 |
| 1 | 0 | 1 | 1 |
| 2 | 1 | 2 | 0 |
| 3 | 1 | 3 | 1 |
| 4 | 0 | 4 | 2 |
| 5 | 1 | 5 | 2 |
| 6 | 0 | 6 | 3 |
| 7 | 1 | 7 | 3 |
| Proposal #1.1-H | | | |
| 0 | 0 | 0 | 0 |
| 1 | 0 | 1 | 1 |
| 2 | 1 | 2 | 0 |
| 3 | 1 | 3 | 1 |
| 4 | 1 | 4 | 2 |
| 5 | 0 | 5 | 2 |
| 6 | 1 | 6 | 3 |
| 7 | 0 | 7 | 3 |

Proposals 1.1-G and 1.1-H exemplarily show other methods of more uniform distribution methods on higher layer RS indexes as compared to Proposals 1.1 -A/1.1-B.

According to Proposals 1.1-G and 1.1-H, when mapping or multiplexing of DRS resources of layer (or RS port), RS resources (patterns) mapped to individual layers according to an arbitrary rank value may be unchanged as necessary. Irrespective of a rank value, a DRS pattern group for each layer is fixed. For example, the present embodiment may provide the rank-independent one-to-one layer-to-RS resource mapping scheme or the rank-independent one-to-one RS port-to-RS resource mapping scheme. Because RS position and patterns for individual layers are unchanged, the rank-independent RS resource mapping scheme may provide RS patterns capable of being applied to SU-MIMO (Single User MIMO), MU-MIMO (Multi User MIMO) or DL CoMP.

In addition, although the above-mentioned tables have disclosed the mapping relationship of resources defined as a DRS pattern group and code of the layer, the scope or spirit of the present invention is not limited thereto, and it should be noted that the present embodiment can also be applied to a variety of proposals of the mapping relationship of resources defined as a DRS pattern group and code index of a virtual antenna port or RS port, instead of the layer. That is, the layer and layer index mentioned in the above-mentioned tables may be converted into a virtual antenna port or RS port, and the virtual antenna port index or RS port index as necessary.

TABLE 10

| Layer index | DRS pattern group index | Code resource index (opt. 1) | Code resource index (opt. 2) |
|---|---|---|---|
| Proposal #1.1-I | | | |
| 0 | 0 | 0 | 0 |
| 1 | 0 | 1 | 1 |
| 2 | 0 | 2 | 2 |
| 3 | 0 | 3 | 3 |
| 4 | 1 | 4 | 0 |

TABLE 10-continued

| Layer index | DRS pattern group index | Code resource index (opt. 1) | Code resource index (opt. 2) |
|---|---|---|---|
| 5 | 1 | 5 | 1 |
| 6 | 1 | 6 | 2 |
| 7 | 1 | 7 | 3 |
| Proposal #1.1-J | | | |
| 0 | 0 | 0 | 0 |
| 1 | 0 | 1 | 1 |
| 2 | 0 | 2 | 2 |
| 3 | 0 | 3 | 3 |
| 4 | 0 | 4 | 4 |
| 5 | 0 | 5 | 5 |
| 6 | 1 | 6 | 0 |
| 7 | 1 | 7 | 1 |

Proposals 1.1-I and 1.1-J exemplarily show a multiplexing scheme for limiting physical resource overhead in a time-frequency resource region for time-frequency DM-RS transmission under any rank below either Rank-4 or Rank-6.

In case of Proposal 1.1-J, the number of orthogonal code covers between transmission symbols of a time domain is not enough to generate 6 code resources with time-frequency resources of one DRS pattern group in the range extending Rank-6, and a code resource having the corresponding length in association with all or some parts of RS physical resources of the corresponding DRS pattern group may be defined as a CAZAC sequence, a DFT sequence, a ZC sequence, a GCL (general chirp-like) sequence or a Walsh sequence.

TABLE 11

| Layer index | DRS pattern group index | Code resource index (opt. 1) | Code resource index (opt. 2) |
|---|---|---|---|
| Proposal #1.1-K | | | |
| 0 | 0 | 0 | 0 |
| 1 | 0 | 1 | 1 |
| 2 | 1 | 2 | 0 |
| 3 | 1 | 3 | 1 |
| 4 | 1 | 4 | 2 |
| 5 | 1 | 5 | 3 |
| 6 | 1 | 6 | 4 |
| 7 | 1 | 7 | 5 |
| Proposal #1.1-L | | | |
| 0 | 0 | 0 | 0 |
| 1 | 1 | 1 | 0 |
| 2 | 0 | 2 | 1 |
| 3 | 1 | 3 | 1 |
| 4 | 1 | 4 | 2 |
| 5 | 1 | 5 | 3 |
| 6 | 1 | 6 | 4 |
| 7 | 1 | 7 | 5 |

Proposal 1.1-K and 1.1-L exemplarily show a method for limiting layer interference in an RS of a lower layer index.

In case of the Proposals 1.1-K and 1.1-L, DRS pattern group #1 provides 6 layer RS patterns. The number of orthogonal code covers between transmission symbols of a time domain is not enough to generate 6 code resources with time-frequency resources of one DRS pattern group in the range extending Rank-6, a code resource having the corresponding length in association with all or some parts of RS physical resources of the corresponding DRS pattern group may be defined as a CAZAC sequence, a DFT sequence, a ZC sequence, a GCL (general chirp-like) sequence or a Walsh sequence.

Next, under the condition that DRS pattern group #0 and DRS pattern group #1 are comprised of A REs (e.g., 12 REs) and B REs (e.g., 12 REs), respectively, detailed proposals for the case where REs of a DRS pattern group in which an RS pattern of layers formed in response to an arbitrary rank value is selected are multiplexed according to FDM, TDM or FDM/TDM scheme will hereinafter be described.

According to Proposals of the present invention, a DRS pattern group for each layer is established irrespective of the rank value. Although the present embodiment exemplarily shows a layer index mapped to a DRS resource for convenience of description, the scope or spirit of the present invention is not limited thereto. In the following tables, the layer index may be replaced with a layer RS index or an antenna RS port. In more detail, after the layer (or layer RS) may be mapped to a DRS resource or the layer (or layer RS) may be mapped to an antenna RS port, the antenna RS port may be mapped to the DRS resource. In this case, reordering or permutation may be applied to the layer index (layer RS index) and/or the antenna RS port. For convenience of description, although the following table exemplarily shows a plurality of ranks up to Rank 8, proposals of the present invention may be equally or similarly extended even to a higher rank system.

In case of defining orthogonal code resources on REs used for individual DRS patterns, the proposals of the present invention may conceptually cover that all REs are distinctively defined in different formats, for example, subcarrier division form, symbol division form, or frequency/symbol division form. Each division RE may be identified by an RS resource index.

The number of all REs of each DRS pattern group may be set to 12. RS resource indexes for each DRS pattern group generated in REs (i.e., 12 REs) are considered to be different RE patterns of individual DRS pattern groups, such that the RS resource indexes may be defined as different indexes (Method 1), or may be defined as the same index between the same patterns (Method 2).

TABLE 12

| Layer index | DRS pattern group index | RS pattern index (opt. 1) | RS pattern index (opt. 2) |
|---|---|---|---|
| [Proposal #1.2-A] | | | |
| 0 | 0 | 0 | 0 |
| 1 | 0 | 1 | 1 |
| 2 | 1 | 2 | 0 |
| 3 | 1 | 3 | 1 |
| 4 | 0 | 4 | 2 |
| 5 | 0 | 5 | 3 |
| 6 | 1 | 6 | 2 |
| 7 | 1 | 7 | 3 |
| [Proposal #1.2-B] | | | |
| 0 | 0 | 0 | 0 |
| 1 | 0 | 1 | 1 |
| 2 | 1 | 2 | 0 |
| 3 | 1 | 3 | 1 |
| 4 | 1 | 4 | 2 |
| 5 | 1 | 5 | 3 |
| 6 | 0 | 6 | 2 |
| 7 | 0 | 7 | 3 |

Proposal 1.2-A exemplarily shows the case where a DRS pattern group is changed whenever the layer index is increased by 2. That is, if the layer index is set to 0~1, only the DRS pattern group #0 is used, and two RS pattern indexes are used for insufficient resources. Similarly, if the layer index is set to any of 2~3, 3~4 and 6~7, DRS pattern group #1, DRS pattern group #0, and DRS pattern group #1 are sequentially applied to the layer index.

Proposal 1.2-B exemplarily shows modification of Proposal 1.2-A. Proposal 1.2-B may also be interpreted as the case where the layer index is rearranged in the proposal 1.2-A. In more detail, Method 2 of the proposal 1.2-B may correspond to the case where the layer indexes 4, 5, 6 and 7 are rearranged in the order of 6→7→4→5 in Method 2 of Proposal 1.2-A.

TABLE 13

| Layer index | DRS pattern group index | RS pattern index (opt. 1) | RS pattern index (opt. 2) |
|---|---|---|---|
| [Proposal #1.2-C] | | | |
| 0 | 0 | 0 | 0 |
| 1 | 1 | 1 | 0 |
| 2 | 0 | 2 | 1 |
| 3 | 1 | 3 | 1 |
| 4 | 0 | 4 | 2 |
| 5 | 1 | 5 | 2 |
| 6 | 0 | 6 | 3 |
| 7 | 1 | 7 | 3 |
| [Proposal #1.2-D] | | | |
| 0 | 0 | 0 | 0 |
| 1 | 1 | 1 | 0 |
| 2 | 1 | 2 | 1 |
| 3 | 0 | 3 | 1 |
| 4 | 1 | 4 | 2 |
| 5 | 0 | 5 | 2 |
| 6 | 1 | 6 | 3 |
| 7 | 0 | 7 | 3 |

Proposal 1.2-C exemplarily shows the DRS pattern group index first mapping scheme. That is, according to the proposal 1.2-C, layer indexes are sequentially mapped to DRS pattern group #0 and DRS pattern group #1. If the number of layer indexes is insufficient, an RS pattern index is changed in the DRS pattern group. Proposal 1.2-D exemplarily shows modification of the proposal 1.2-C. Proposals 1.2-C and 1.2-D can also be applied to the case where 24 REs are used in a DRS pattern group in case of Rank 2 or higher.

TABLE 14

| Layer index | DRS pattern group index | RS pattern index (opt. 1) | RS pattern index (opt. 2) |
|---|---|---|---|
| [Proposal #1.2-E] | | | |
| 0 | 0 | 0 | 0 |
| 1 | 0 | 1 | 1 |
| 2 | 1 | 2 | 0 |
| 3 | 1 | 3 | 1 |
| 4 | 0 | 4 | 2 |
| 5 | 1 | 5 | 3 |
| 6 | 0 | 6 | 2 |
| 7 | 1 | 7 | 3 |
| [Proposal #1.2-F] | | | |
| 0 | 0 | 0 | 0 |
| 1 | 0 | 1 | 1 |
| 2 | 1 | 2 | 0 |
| 3 | 1 | 3 | 1 |
| 4 | 1 | 4 | 2 |
| 5 | 0 | 5 | 3 |
| 6 | 1 | 6 | 2 |
| 7 | 0 | 7 | 3 |

Proposals 1.2-E and 1.2-F exemplarily show more uniform distribution methods on higher layer RS indexes as compared to Proposals 1.2-A1.2-B.

Next, under the condition that DRS pattern group #0 and DRS pattern group #1 are comprised of A REs (e.g., 12 REs) and B REs (e.g., 12 REs), respectively, detailed proposals for the case where REs of the corresponding DRS pattern group in which an RS pattern of layers formed in response to an arbitrary rank value is selected are multiplexed according to FDM, TDM or FDM/TDM scheme will hereinafter be described.

In case of defining orthogonal code resources on REs used for individual DRS patterns, the proposals of the present invention may conceptually cover that all REs are distinctively defined in different formats, for example, subcarrier division form, symbol division form, or frequency/symbol division form. Each division RE may be identified by an RS resource index. In this case, as many REs as the maximum number of layer indexes to be multiplexed from among all the REs of the arbitrary DRS pattern group may be divided as in the proposal #1.2, but it should be noted that a smaller number of REs than the above-mentioned number of REs may be divided in consideration of additional CDM multiplexing.

When defining orthogonal code resources on REs used for individual DRS patterns, not only Walsh code or Walsh-hadamard orthogonal code sequences on REs of a frequency domain, but also Walsh covering for REs on OFDM symbols may be used. Orthogonal code resource allocation of cyclic shifts on CAZAC-based GCL or ZC sequence may be applied to the present embodiment. In addition, cyclic shifts of quasi-orthogonal gold code sequence, Kasami sequence or m-sequence binaries may be used as code resources. In addition, when applying the above-mentioned arbitrary code sequence to each DRS pattern group or the entire DRS pattern group, the arbitrary code sequence may be applied to REs of a frequency domain on an OFDM symbol having the corresponding RE, or may be mapped to all of the corresponding REs (on one or more DRS pattern groups). Differently from the above-mentioned description, the present embodiment may generate/map sequences in response to some REs divided in FDM, TDM or FDM/TDM scheme of all the REs of the arbitrary DRS pattern group. When applying the resource allocation of the present invention, each code resource is defined as a code resource index.

Mapping individual layers to arbitrary RS patterns and/or code resources may be achieved in a time-first scheme, a frequency first scheme, or a code-first scheme. If the above-mentioned mapping is achieved in three resource regions using the multiplexing scheme, the mapping may be achieved in the order of time→frequency→code (i.e., time-frequency-code), the order of time→code→frequency (i.e., time-code-frequency), the order of frequency→time→code (i.e., frequency-time-code), the order of frequency→code→time (i.e., frequency-code-time), the order of code→time→frequency (i.e., code-time-frequency), or the order of code→frequency→time (i.e., code-frequency-time).

A method for mapping the layer to a DRS resource with reference to Tables will hereinafter be described in detail. According to the proposals of the present invention, DRS pattern groups of individual layers are established irrespective of a rank value. For convenience of description, the layer index may be replaced with a layer RS index or an antenna RS port in the following tables. In other words, after layer (or layer RS) may be mapped to DRS resources or an antenna RS port, the antenna RS port may be mapped to the DRS resources. In this case, reordering or permutation may be applied to layer index (layer RS index) and/or the antenna RS port. Although the following table exemplarily shows a plurality of ranks up to Rank 8 for convenience of description, the scheme proposed by the present invention may also be equally or similarly extended even to the system having a higher rank value.

In the following tables, Method 1 and Method 2 may be used. According to Method 1, the number of REs of each DRS pattern group may be set to 12, and RS pattern indexes generated in 12 REs are considered to be different RE patterns of individual DRS pattern groups, such that the RS pattern indexes may be defined as different indexes. According to Method 2, RS pattern indexes generated in 12 REs may be defined as the same RE patterns, such that they can be defined as the same index between the same patterns.

In the following tables, the number of REs of each DRS pattern group may be set to 12, and the length of a code sequence may be defined as 12. Differently from the above-mentioned setting, the present embodiment may generate/map sequences in response to some REs divided in FDM, TDM or FDM/TDM scheme of all the REs of the arbitrary DRS pattern group. According to Method (a), arbitrary numbers of code resources may be differently assigned to respective DRS pattern groups. In this case, the arbitrary code resources may be requested on an arbitrary DRS pattern group, or as many code resources as the number of available code resources may be defined. According to Method (b), the same code resource setting for each DRS pattern group may be defined. In this case, the same code resource setting may be requested on a pattern group or as many code resources as the number of available code resources may be defined. Each code resource index #0 may be comprised of '1'. That is, if the layer RS pattern is assigned to a DRS pattern group, an orthogonal code may not be used as necessary.

TABLE 15

| Layer index | DRS pattern group index | RS pattern index & Code resource index (opt. 1-b) | RS pattern index & Code resource index (opt. 2-b) |
|---|---|---|---|
| [Proposal #1.3-A] | | | |
| 0 | 0 | 0&0 | 0&0 |
| 1 | 0 | 0&1 | 0&1 |
| 2 | 1 | 1&0 | 0&0 |
| 3 | 1 | 1&1 | 0&1 |
| 4 | 0 | 2&0 | 1&0 |
| 5 | 0 | 2&1 | 1&1 |
| 6 | 1 | 3&0 | 1&0 |
| 7 | 1 | 3&1 | 1&1 |
| [Proposal #1.3-B] | | | |
| 0 | 0 | 0&0 | 0&0 |
| 1 | 0 | 0&1 | 0&1 |
| 2 | 1 | 1&0 | 0&0 |
| 3 | 1 | 1&1 | 0&1 |
| 4 | 1 | 2&0 | 1&0 |
| 5 | 1 | 2&1 | 1&1 |
| 6 | 0 | 3&0 | 1&0 |
| 7 | 0 | 3&1 | 1&1 |

Proposal 1.3-A exemplarily shows the case where the DRS pattern group is changed whenever the layer index is increased by 2. That is, if the layer index is set to 0~1 or 4~5, only the DRS pattern group #0 is used, and two RS pattern indexes and/or two code resource indexes may be used for insufficient resources. Similarly, if the layer index is set to any one of 2~3 and 6~7, only the DRS pattern group #1 is applied.

Proposal 1.3-B exemplarily shows modification of the proposal 1.3-A. Proposal 1.3-B may also be interpreted as the case where the layer index is rearranged in the proposal 1.3-A. In more detail, Method 2-b of the proposal 1.3-B may correspond to the case where the layer indexes 4, 5, 6 and 7 in Method 2-B of the proposal 1.3-A are rearranged in the order of 6→7→4→5.

TABLE 16

| Layer index | DRS pattern group index | RS pattern index & Code resource index (opt. 1-a) | RS pattern index & Code resource index (opt. 2-a) |
|---|---|---|---|
| [Proposal #1.3-C] | | | |
| 0 | 0 | 0&0 | 0&0 |
| 1 | 0 | 0&1 | 0&1 |
| 2 | 1 | 1&2 | 0&2 |
| 3 | 1 | 1&3 | 0&3 |
| 4 | 0 | 2&4 | 1&4 |
| 5 | 0 | 2&5 | 1&5 |
| 6 | 1 | 3&6 | 1&6 |
| 7 | 1 | 3&7 | 1&7 |
| [Proposal #1.3-D] | | | |
| 0 | 0 | 0&0 | 0&0 |
| 1 | 0 | 0&1 | 0&1 |
| 2 | 1 | 1&2 | 0&2 |
| 3 | 1 | 1&3 | 0&3 |
| 4 | 1 | 2&4 | 1&4 |
| 5 | 1 | 2&5 | 1&5 |
| 6 | 0 | 3&6 | 1&6 |
| 7 | 0 | 3&7 | 1&7 |

TABLE 17

| Layer index | DRS pattern group index | RS pattern index & Code resource index (opt. 1-b) | RS pattern index & Code resource index (opt. 2-b) |
|---|---|---|---|
| [Proposal #1.3-E] | | | |
| 0 | 0 | 0&0 | 0&0 |
| 1 | 0 | 0&1 | 0&1 |
| 2 | 1 | 1&0 | 0&0 |
| 3 | 1 | 1&1 | 0&1 |
| 4 | 0 | 2&2 | 1&2 |
| 5 | 0 | 2&3 | 1&3 |
| 6 | 1 | 3&2 | 1&2 |
| 7 | 1 | 3&3 | 1&3 |
| [Proposal #1.3-F] | | | |
| 0 | 0 | 0&0 | 0&0 |
| 1 | 0 | 0&1 | 0&1 |
| 2 | 1 | 1&0 | 0&0 |
| 3 | 1 | 1&1 | 0&1 |
| 4 | 1 | 2&2 | 1&2 |
| 5 | 1 | 2&3 | 1&3 |
| 6 | 0 | 3&2 | 1&2 |
| 7 | 0 | 3&3 | 1&3 |

TABLE 18

| Layer index | DRS pattern group index | RS pattern index & Code resource index (opt. 1-b) | RS pattern index & Code resource index (opt. 2-b) |
|---|---|---|---|
| [Proposal #1.3-G] | | | |
| 0 | 0 | 0&0 | 0&0 |
| 1 | 1 | 0&0 | 0&0 |
| 2 | 0 | 0&1 | 0&1 |
| 3 | 1 | 0&1 | 0&1 |
| 4 | 0 | 1&2 | 1&0 |
| 5 | 1 | 1&2 | 1&0 |
| 6 | 0 | 1&3 | 1&1 |
| 7 | 1 | 1&3 | 1&1 |
| [Proposal #1.3-H] | | | |
| 0 | 0 | 0&0 | 0&0 |
| 1 | 1 | 0&0 | 0&0 |
| 2 | 1 | 0&1 | 0&1 |
| 3 | 0 | 0&1 | 0&1 |
| 4 | 1 | 1&2 | 1&0 |
| 5 | 0 | 1&2 | 1&0 |
| 6 | 1 | 1&3 | 1&1 |
| 7 | 0 | 1&3 | 1&1 |

Under the condition that each DRS pattern group #0 or #1 includes A (e.g., 12) REs or B (e.g., 12) REs, a detailed description of the exemplary case in which RS patterns of layers formed according to an arbitrary rank value are two-dimensionally CDM-processed in REs of the corresponding DRS pattern group will hereinafter be described in detail. In more detail, in association with REs of the DRS pattern group, a first code resource may be applied to a time domain, and a second code resource may be applied to a frequency domain. The order of a time domain and a frequency domain, each of which receives code resources, may be changed as necessary. For example, in association with REs of the DRS pattern group, a first code resource may be used as a cover sequence in a time domain, and a second code resource may be used as a scrambling code resource in a frequency domain, or vice versa. In the meantime, it may be possible to perform forward or reversal code index mapping in association with the order of OFDM symbol indexes. The forward or reversal code index mapping may be considered in the mapping process where each symbol having an element '1' is not punctured to prevent pattern orthogonality from being broken even in the puncturing situation.

Code resources used for REs of each DRS pattern may include OVSF (Orthogonal Variable Spreading Factor) code, DFT (Discrete Fourier Transform)-based code, and a Walsh or Walsh-Hadamard-based orthogonal code sequence. In addition, code resources may include cyclic shifts of a CAZAC-based GCL (Generalized Chirp Like) sequence, a CG-CAZAC (Computer Generated CAZAC) sequence, and a ZC or ZC-ZCZ (Zadoff-Chu zero correlation zone) sequence. In addition, code resources may include cyclic shifts of a quasi-orthogonal gold code sequence, a Kasami sequence, and m-sequence binaries.

Although the scope or spirit of the present invention is not limited thereto, a first code resource for 2-D CDM includes an orthogonal sequence cover (e.g., Walsh cover) applied to a time domain. For example, the Walsh cover may include {1,1} or {1,−1} applied to RE pairs of two contiguous OFDM symbols in the same pattern group. If three OFDM symbols are contiguous to each other in the DRS pattern group, a DFT-based Walsh cover having the length of 3 may be used. In this case, two of three Walsh covers each having the length of 3 may be used. In addition, a second code resource for 2-D CDM may include a cyclic shift sequence applied to REs contained in one OFDM symbol in the same DRS pattern group. For example, the second code resource may include cyclic shifts of CAZAC, ZC, ZCZ, gold code, Kasami sequences and m-sequence binary.

A method for mapping layer or (virtual) antenna port to DRS resources will hereinafter be described in detail with reference to Tables. According to Proposals of the present invention, a DRS pattern group for each layer is established irrespective of the rank value. For convenience of description, although the following table exemplarily shows the layer index mapped to DRS resources, the scope or spirit of the present invention is not limited thereto. In the following tables, the layer index may be replaced with a layer RS index or an antenna RS port. In more detail, after the layer (or layer RS) may be mapped to a DRS resource or the layer (or layer RS) may be mapped to an antenna RS port, the antenna RS port may be mapped to the DRS resource. In this case, reordering or permutation may be applied to the layer index (layer RS index) and/or the antenna RS port. For convenience of description, although the following table exemplarily shows a plurality of ranks up to Rank 8, proposals of the present invention may be equally or similarly extended even to a higher rank system.

Layer RS patterns of the proposals #2.1 to #2.25 to be described below show resource multiplexing schemes of individual layer RSs extending to Rank-8. If an arbitrary rank value is given, the proposals #2.1 to #2.25 may be understood as the multiplexing pattern extending to layer RS indexes derived from the corresponding rank value. In other words, irrespective of the rank value, the same layer RS pattern, namely, the same layer RS mapping, may be applied to the present embodiment.

In the following tables, the order of a DRS pattern group, a Walsh cover (WC) index, and a cyclic shift (CS) index may be described only for distinction for convenience of description. Such index order may be applied to an actual physical RE (or physical RE pattern) resource and a code resource index without change, or may be arbitrarily mapped thereto.

One or more patterns from among multiplexing patterns of all the layer REs described in arbitrary proposals from among one or more proposals of the following proposals #2.1~#2.25 are combined such that the entire layer RS patterns may be reconstructed. All the proposals capable of being derived from the above-mentioned process may be contained in proposals of the present invention.

RS resources exemplarily shown in the proposals #2.1~#2.25 are as follows.

WC (Wash cover) index #0, #1 (for example, WC #0: {1, 1}, WC #1: {1,−1})

CS (Cyclic Shift) index #0, #1

DRS pattern group index #0, #1

Case A exemplarily shows that WC is first mapped and CS is then mapped.

Case A exemplarily shows that CS is first mapped, and WC is then mapped.

Although the scope or spirit of the present invention is not limited thereto, as can be seen from the following tables, WC index may be used as a cover sequence resource and CS index may be used as a scrambling code resource, or vice versa.

TABLE 19

| Layer index | DRS pattern group index | Code resource index (WC index) | Code resource index (CS index) |
|---|---|---|---|
| [Proposal #2.1-A] | | | |
| 0 | 0 | 0 | 0 |
| 1 | 0 | 1 | 0 |

TABLE 19-continued

| Layer index | DRS pattern group index | Code resource index (WC index) | Code resource index (CS index) |
|---|---|---|---|
| 2 | 1 | 0 | 0 |
| 3 | 1 | 1 | 0 |
| 4 | 0 | 0 | 1 |
| 5 | 0 | 1 | 1 |
| 6 | 1 | 0 | 1 |
| 7 | 1 | 1 | 1 |
| [Proposal #2.1-B] | | | |
| 0 | 0 | 0 | 0 |
| 1 | 0 | 0 | 1 |
| 2 | 1 | 0 | 0 |
| 3 | 1 | 0 | 1 |
| 4 | 0 | 1 | 0 |
| 5 | 0 | 1 | 1 |
| 6 | 1 | 1 | 0 |
| 7 | 1 | 1 | 1 |

Proposal 2.1-A exemplarily shows the case where RS resources are mapped in the order of WC index→DRS pattern group index→CS index in response to the increasing layer index.

Proposal 2.1-B exemplarily shows the case where RS resources are mapped in the order of CS index→DRS pattern group index→WC index in response to the increasing layer index.

TABLE 20

| Layer index | DRS pattern group index | Code resource index (WC index) | Code resource index (CS index) |
|---|---|---|---|
| [Proposal #2.2-A] | | | |
| 0 | 0 | 0 | 0 |
| 1 | 0 | 1 | 0 |
| 2 | 1 | 0 | 0 |
| 3 | 1 | 1 | 0 |
| 4 | 1 | 0 | 1 |
| 5 | 1 | 1 | 1 |
| 6 | 0 | 0 | 1 |
| 7 | 0 | 1 | 1 |
| [Proposal #2.2-B] | | | |
| 0 | 0 | 0 | 0 |
| 1 | 0 | 0 | 1 |
| 2 | 1 | 0 | 0 |
| 3 | 1 | 0 | 1 |
| 4 | 1 | 1 | 0 |
| 5 | 1 | 1 | 1 |
| 6 | 0 | 1 | 0 |
| 7 | 0 | 1 | 1 |

Proposal 2.2-A exemplarily shows modification of Proposal 2.1-A. Proposal 2.2-A may also be interpreted as the case where the layer index is rearranged in the proposal 2.1-A. In more detail, the proposal 2.1-A may correspond to the case where the layer indexes 4, 5, 6 and 7 are rearranged in the order of 6→7→4→5 in Proposal 2.1-A.

Proposal 2.2-B exemplarily shows modification of Proposal 2.1-B. Proposal 2.2-B may also be interpreted as the case where the layer index is rearranged in the proposal 2.1-B. In more detail, the proposal 2.1-B may correspond to the case where the layer indexes 4, 5, 6 and 7 are rearranged in the order of 6→7→4→5 in Proposal 2.1-B.

TABLE 21

| Layer index | DRS pattern group index | Code resource index (WC index) | Code resource index (CS index) |
|---|---|---|---|
| [Proposal #2.3-A] | | | |
| 0 | 0 | 0 | 0 |
| 1 | 0 | 1 | 0 |
| 2 | 0 | 0 | 1 |
| 3 | 0 | 1 | 1 |
| 4 | 1 | 0 | 0 |
| 5 | 1 | 1 | 0 |
| 6 | 1 | 0 | 1 |
| 7 | 1 | 1 | 1 |
| [Proposal #2.3-B] | | | |
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 7 | 1 | 1 | 1 |

Proposal 2.3-A exemplarily shows the case where RS resources are mapped in the order of WC index→CS index→DRS pattern group index in response to the increasing layer index.

Proposal 2.3-B exemplarily shows the case where RS resources are mapped in the order of CS index→WC index→DRS pattern group index in response to the increasing layer index.

TABLE 22

| Layer index | DRS pattern group index | Code resource index (CS index) | Code resource index (WC index) |
|---|---|---|---|
| [Proposal #2.4] | | | |
| 0 | 0 | 0 | 0 |
| 1 | 0 | 1 | 0 |
| 2 | 1 | 0 | 0 |
| 3 | 1 | 1 | 0 |
| 4 | 0 | 2 | 0 |
| 5 | 0 | 3 | 0 |
| 6 | 1 | 2 | 0 |
| 7 | 1 | 3 | 0 |
| [Proposal #2.5] | | | |
| 0 | 0 | 0 | 0 |
| 1 | 0 | 1 | 0 |
| 2 | 1 | 0 | 0 |
| 3 | 1 | 1 | 0 |
| 4 | 1 | 2 | 0 |
| 5 | 1 | 3 | 0 |
| 6 | 0 | 2 | 0 |
| 7 | 0 | 3 | 0 |

Proposal 2.4 shows an exemplary model in which four cyclic shift (CS) code resources are used in the proposal 2.1 (i.e., no WC-based code multiplexing).

Proposal 2.5 shows an exemplary model in which four cyclic shift (CS) code resources are used in the proposal 2.2 (i.e., no WC-based code multiplexing).

TABLE 23

| Layer index | DRS pattern group index | Code resource index (CS index) | Code resource index (WC index) |
|---|---|---|---|
| [Proposal #2.6] | | | |
| 0 | 0 | 0 | 0 |
| 1 | 0 | 1 | 0 |
| 2 | 1 | 0 | 0 |
| 3 | 1 | 1 | 0 |
| 4 | 0 | 2 | 0 |
| 5 | 0 | 3 | 0 |
| 6 | 1 | 2 | 1 |
| 7 | 1 | 3 | 1 |
| [Proposal #2.7] | | | |
| 0 | 0 | 0 | 0 |
| 1 | 0 | 1 | 0 |
| 2 | 1 | 0 | 0 |
| 3 | 1 | 1 | 0 |
| 4 | 0 | 2 | 1 |
| 5 | 0 | 3 | 1 |
| 6 | 1 | 2 | 1 |
| 7 | 1 | 3 | 1 |

Proposal 2.6 shows an exemplary model in which four cyclic shift (CS) code resources are used in the proposal 2.1 (i.e., multiplexing of 2 WC-based codes).

Proposal 2.7 shows an exemplary model in which four cyclic shift (CS) code resources are used in the proposal 2.1 (i.e., multiplexing of 2 WC-based codes).

TABLE 24

| Layer index | DRS pattern group index | Code resource index (CS index) | Code resource index (WC index) |
|---|---|---|---|
| [Proposal #2.8] | | | |
| 0 | 0 | 0 | 0 |
| 1 | 0 | 1 | 0 |
| 2 | 1 | 0 | 0 |
| 3 | 1 | 1 | 0 |
| 4 | 1 | 2 | 0 |
| 5 | 1 | 3 | 0 |
| 6 | 0 | 2 | 1 |
| 7 | 0 | 3 | 1 |
| [Proposal #2.9] | | | |
| 0 | 0 | 0 | 0 |
| 1 | 0 | 1 | 0 |
| 2 | 1 | 0 | 0 |
| 3 | 1 | 1 | 0 |
| 4 | 1 | 2 | 1 |
| 5 | 1 | 3 | 1 |
| 6 | 0 | 2 | 1 |
| 7 | 0 | 3 | 1 |

Proposal 2.8 shows an exemplary case in which four CS code resources are used in the proposal 2.2 (i.e., multiplexing of 2 WC-based codes).

Proposal 2.9 shows an exemplary case in which four CS code resources are used in the proposal 2.2 (i.e., multiplexing of 2 WC-based codes).

TABLE 25

| Layer index | DRS pattern group index | Code resource index (CS index) | Code resource index (WC index) |
|---|---|---|---|
| [Proposal #2.10] | | | |
| 0 | 0 | 0 | 0 |
| 1 | 0 | 0 | 1 |
| 2 | 1 | 0 | 0 |
| 3 | 1 | 0 | 1 |
| 4 | 0 | 0 | 2 |
| 5 | 0 | 1 | 2 |
| 6 | 1 | 0 | 2 |
| 7 | 1 | 1 | 2 |
| [Proposal #2.11] | | | |
| 0 | 0 | 0 | 0 |
| 1 | 0 | 0 | 1 |
| 2 | 1 | 0 | 0 |
| 3 | 1 | 0 | 1 |
| 4 | 1 | 0 | 2 |
| 5 | 1 | 1 | 2 |
| 6 | 0 | 0 | 2 |
| 7 | 0 | 1 | 2 |

Proposal 2.10 shows an exemplary case in which three Walsh covers (WCs) and two CS code resources are used in the proposal 2.1.

Proposal 2.11 shows an exemplary case in which three Walsh covers (WCs) and two CS code resources are used in the proposal 2.2.

TABLE 26

| Layer index | DRS pattern group index | Code resource index (CS index) | Code resource index (WC index) |
|---|---|---|---|
| [Proposal #2.12] | | | |
| 0 | 0 | 0 | 0 |
| 1 | 0 | 1 | 0 |
| 2 | 1 | 0 | 0 |
| 3 | 1 | 1 | 0 |
| 4 | 1 | 0 | 1 |
| 5 | 1 | 1 | 1 |
| 6 | 1 | 2 | 0 |
| 7 | 1 | 3 | 0 |
| [Proposal #2.13] | | | |
| 0 | 0 | 0 | 0 |
| 1 | 0 | 1 | 0 |
| 2 | 1 | 0 | 0 |
| 3 | 1 | 1 | 0 |
| 4 | 1 | 0 | 1 |
| 5 | 1 | 1 | 1 |
| 6 | 1 | 2 | 1 |
| 7 | 1 | 3 | 1 |

Proposal 2.12 shows an exemplary model in which uneven layer RS pattern mapping to the DRS pattern group, four cyclic shift (CS) code resources, and two WC code resources are used.

Proposal 2.13 shows an exemplary model in which uneven layer RS pattern mapping to the DRS pattern group, four CS code resources and two WC code resources are used (Compared to Proposal 2.12, different WCs may be used in the layer-6 or layer-7 RS patterns.

TABLE 27

| Layer index | DRS pattern group index | Code resource index (CS index) | Code resource index (WC index) |
|---|---|---|---|
| [Proposal #2.14] | | | |
| 0 | 0 | 0 | 0 |
| 1 | 0 | 0 | 1 |
| 2 | 1 | 0 | 0 |
| 3 | 1 | 0 | 1 |
| 4 | 1 | 1 | 0 |
| 5 | 1 | 1 | 1 |
| 6 | 1 | 1 | 2 |
| 7 | 1 | 1 | 2 |
| [Proposal #2.15] | | | |
| 0 | 0 | 0 | 0 |
| 1 | 0 | 0 | 1 |
| 2 | 1 | 0 | 0 |
| 3 | 1 | 0 | 1 |
| 4 | 1 | 1 | 0 |
| 5 | 1 | 1 | 1 |
| 6 | 1 | 0 | 2 |
| 7 | 1 | 0 | 2 |

Proposal 2.14 exemplarily shows uneven layer RS pattern mapping to the DRS pattern group, three Walsh covers (WCs) and two CS code resources are used.

Proposal 2.15 exemplarily shows uneven layer RS pattern mapping to the pattern group, three Walsh covers (WCs) and two CS code resources are used (Compared to the proposal 2.14, different CSs may be used in the layer-6 and layer-7 RS patterns).

TABLE 28

| Layer index | DRS pattern group index | Code resource index (CS index) | Code resource index (WC index) |
|---|---|---|---|
| [Proposal #2.16] | | | |
| 0 | 0 | 0 | 0 |
| 1 | 0 | 1 | 0 |
| 2 | 1 | 0 | 0 |
| 3 | 1 | 1 | 0 |
| 4 | 1 | 0 | 1 |
| 5 | 1 | 1 | 1 |
| 6 | 1 | 0 | 2 |
| 7 | 1 | 1 | 2 |
| [Proposal #2.17] | | | |
| 0 | 0 | 0 | 0 |
| 1 | 0 | 0 | 1 |
| 2 | 1 | 0 | 0 |
| 3 | 1 | 1 | 0 |
| 4 | 1 | 0 | 1 |
| 5 | 1 | 1 | 1 |
| 6 | 1 | 0 | 2 |
| 7 | 1 | 1 | 2 |

Proposal 2.16 shows an exemplary model in which uneven layer RS pattern mapping to the DRS pattern group, three Walsh covers (WCs) and two cyclic shift (CS) code resources are used.

Proposal 2.17 shows an exemplary model in which uneven layer RS pattern mapping to the DRS pattern group, three WCs and two CS code resources are used. The proposal 2.17 uses different cyclic shifts at Layer 0 and one RS pattern as compared to the proposal 2.14.

TABLE 29

| Layer index | DRS pattern group index | Code resource index (CS index) | Code resource index (WC index) |
|---|---|---|---|
| \[Proposal #2.18\] | | | |
| 0 | 0 | 0 | 0 |
| 1 | 0 | 1 | 0 |
| 2 | 1 | 0 | 0 |
| 3 | 1 | 0 | 1 |
| 4 | 1 | 1 | 0 |
| 5 | 1 | 1 | 1 |
| 6 | 1 | 1 | 2 |
| 7 | 1 | 1 | 2 |
| \[Proposal #2.19\] | | | |
| 0 | 0 | 0 | 0 |
| 1 | 0 | 1 | 0 |
| 2 | 1 | 0 | 0 |
| 3 | 1 | 0 | 1 |
| 4 | 1 | 1 | 0 |
| 5 | 1 | 1 | 1 |
| 6 | 1 | 0 | 2 |
| 7 | 1 | 0 | 2 |

Proposal 2.18 shows an exemplary model in which uneven layer RS pattern mapping to the DRS pattern group, three Walsh covers (WCs) and two cyclic shift (CS) code resources are used.

Proposal 2.19 shows an exemplary model in which uneven layer RS pattern mapping to the DRS pattern group, three WCs and two CS code resources are used. The proposal 2.19 uses different CSs at Layer 6 and 7 RS patterns as compared to the proposal 2.18.

TABLE 30

| Layer index | DRS pattern group index | Code resource index (WC index) | Code resource index (CS index) |
|---|---|---|---|
| \[Proposal #2.1-C\] | | | |
| 0 | 0 | 0 | 0 |
| 1 | 0 | 1 | 0 |
| 2 | 1 | 0 | 0 |
| 3 | 1 | 1 | 0 |
| 4 | 0 | 0 | 1 |
| 5 | 1 | 0 | 1 |
| 6 | 0 | 1 | 1 |
| 7 | 1 | 1 | 1 |
| \[Proposal #2.1-D\] | | | |
| 0 | 0 | 0 | 0 |
| 1 | 0 | 0 | 1 |
| 2 | 1 | 0 | 0 |
| 3 | 1 | 0 | 1 |
| 4 | 0 | 1 | 0 |
| 5 | 1 | 1 | 0 |
| 6 | 0 | 1 | 1 |
| 7 | 1 | 1 | 1 |

Proposals 2.1-C and 2.1-D exemplarily show a method for more uniformly arranging DRS patterns in the DRS pattern group at a high layer RS index as compared to the proposals 2.1-A and 2.1-B.

TABLE 31

| Layer index | DRS pattern group index | Code resource index (WC index) | Code resource index (CS index) |
|---|---|---|---|
| \[Proposal #2.2-C\] | | | |
| 0 | 0 | 0 | 0 |
| 1 | 0 | 1 | 0 |
| 2 | 1 | 0 | 0 |
| 3 | 1 | 1 | 0 |
| 4 | 1 | 0 | 1 |
| 5 | 0 | 0 | 1 |
| 6 | 1 | 1 | 1 |
| 7 | 0 | 1 | 1 |
| \[Proposal #2.2-D\] | | | |
| 0 | 0 | 0 | 0 |
| 1 | 0 | 0 | 1 |
| 2 | 1 | 0 | 0 |
| 3 | 1 | 0 | 1 |
| 4 | 1 | 1 | 0 |
| 5 | 0 | 1 | 0 |
| 6 | 1 | 1 | 1 |
| 7 | 0 | 1 | 1 |

Proposals 2.2-C and 2.2-D exemplarily show a method for more uniformly arranging DRS patterns in the DRS pattern group at a high layer RS index as compared to the proposals 2.2-A and 2.2-B.

TABLE 32

| Layer index | DRS pattern group index | Code resource index (WC index) | Code resource index (CS index) |
|---|---|---|---|
| \[Proposal #2.2-E\] | | | |
| 0 | 0 | 0 | 0 |
| 1 | 0 | 0 | 0 |
| 2 | 1 | 1 | 0 |
| 3 | 1 | 1 | 0 |
| 4 | 0 | 2 | 0 |
| 5 | 1 | 2 | 0 |
| 6 | 0 | 3 | 0 |
| 7 | 1 | 3 | 0 |
| \[Proposal #2.2-F\] | | | |
| 0 | 0 | 0 | 0 |
| 1 | 0 | 0 | 0 |
| 2 | 1 | 1 | 0 |
| 3 | 1 | 1 | 0 |
| 4 | 1 | 2 | 0 |
| 5 | 0 | 2 | 0 |
| 6 | 1 | 3 | 0 |
| 7 | 0 | 3 | 0 |

Proposals 2.2-E and 2.2-F exemplarily show a method for more uniformly arranging DRS patterns in the DRS patter group at a high layer RS index as compared to the proposals 2.2-A and 2.2-B.

TABLE 33

| Layer index | DRS pattern group index | Code resource index (WC index) | Code resource index (CS index) |
|---|---|---|---|
| \[Proposal #2.2-G\] | | | |
| 0 | 0 | 0 | 0 |
| 1 | 0 | 0 | 0 |
| 2 | 1 | 1 | 1 |
| 3 | 1 | 1 | 1 |
| 4 | 0 | 2 | 0 |
| 5 | 1 | 2 | 1 |

TABLE 33-continued

| Layer index | DRS pattern group index | Code resource index (WC index) | Code resource index (CS index) |
|---|---|---|---|
| 6 | 0 | 3 | 0 |
| 7 | 1 | 3 | 1 |
| [Proposal #2.2-H] | | | |
| 0 | 0 | 0 | 0 |
| 1 | 0 | 0 | 0 |
| 2 | 1 | 1 | 1 |
| 3 | 1 | 1 | 1 |
| 4 | 1 | 2 | 1 |
| 5 | 0 | 2 | 0 |
| 6 | 1 | 3 | 1 |
| 7 | 0 | 3 | 0 |

Proposals 2.2-G and 2.2-H exemplarily show a method for more uniformly arranging DRS patterns in the DRS pattern group at a high layer RS index as compared to the proposals 2.2-A and 2.2-B.

TABLE 34

| Layer index | DRS pattern group index | Code resource index (WC index) | Code resource index (CS index) |
|---|---|---|---|
| [Proposal #2.2-I] | | | |
| 0 | 0 | 0 | 0 |
| 1 | 0 | 0 | 0 |
| 2 | 1 | 1 | 1 |
| 3 | 1 | 1 | 1 |
| 4 | 0 | 2 | 2 |
| 5 | 1 | 2 | 2 |
| 6 | 0 | 3 | 3 |
| 7 | 1 | 3 | 3 |
| [Proposal #2.2-J] | | | |
| 0 | 0 | 0 | 0 |
| 1 | 0 | 0 | 0 |
| 2 | 1 | 1 | 1 |
| 3 | 1 | 1 | 1 |
| 4 | 1 | 2 | 2 |
| 5 | 0 | 2 | 2 |
| 6 | 1 | 3 | 3 |
| 7 | 0 | 3 | 3 |

Proposals 2.2-I and 2.2-J exemplarily show a method for more uniformly arranging DRS patterns in the DRS pattern group at a high layer RS index as compared to the proposals 2.2-A and 2.2-B.

TABLE 35

| Layer index | DRS pattern group index | Code resource index (CS index) | Code resource index (WC index) |
|---|---|---|---|
| [Proposal #2.4-A] | | | |
| 0 | 0 | 0 | 0 |
| 1 | 0 | 1 | 0 |
| 2 | 1 | 0 | 0 |
| 3 | 1 | 1 | 0 |
| 4 | 0 | 2 | 0 |
| 5 | 1 | 2 | 0 |
| 6 | 0 | 3 | 0 |
| 7 | 1 | 3 | 0 |
| [Proposal #2.5-A] | | | |
| 0 | 0 | 0 | 0 |
| 1 | 0 | 1 | 0 |
| 2 | 1 | 0 | 0 |
| 3 | 1 | 1 | 0 |

TABLE 35-continued

| Layer index | DRS pattern group index | Code resource index (CS index) | Code resource index (WC index) |
|---|---|---|---|
| 4 | 1 | 2 | 0 |
| 5 | 0 | 2 | 0 |
| 6 | 1 | 3 | 0 |
| 7 | 0 | 3 | 0 |

Proposals 2.4-A and 2.5-A exemplarily show a method for more uniformly arranging DRS patterns in the DRS pattern group at a high layer RS index as compared to the proposals 2.4 and 2.5.

TABLE 36

| Layer index | DRS pattern group index | Code resource index (CS index) | Code resource index (WC index) |
|---|---|---|---|
| [Proposal #2.6-A] | | | |
| 0 | 0 | 0 | 0 |
| 1 | 0 | 1 | 0 |
| 2 | 1 | 0 | 0 |
| 3 | 1 | 1 | 0 |
| 4 | 0 | 2 | 0 |
| 5 | 1 | 2 | 1 |
| 6 | 0 | 3 | 0 |
| 7 | 1 | 3 | 1 |
| [Proposal #2.7-A] | | | |
| 0 | 0 | 0 | 0 |
| 1 | 0 | 1 | 0 |
| 2 | 1 | 0 | 0 |
| 3 | 1 | 1 | 0 |
| 4 | 0 | 2 | 1 |
| 5 | 1 | 2 | 1 |
| 6 | 0 | 3 | 1 |
| 7 | 1 | 3 | 1 |

Proposals 2.6-A and 2.7-A exemplarily show a method for more uniformly arranging DRS patterns in the DRS pattern group at a high layer RS index as compared to the proposals 2.6 and 2.7.

TABLE 37

| Layer index | DRS pattern group index | Code resource index (CS index) | Code resource index (WC index) |
|---|---|---|---|
| [Proposal #2.8-A] | | | |
| 0 | 0 | 0 | 0 |
| 1 | 0 | 1 | 0 |
| 2 | 1 | 0 | 0 |
| 3 | 1 | 1 | 0 |
| 4 | 1 | 2 | 0 |
| 5 | 0 | 2 | 1 |
| 6 | 1 | 3 | 0 |
| 7 | 0 | 3 | 1 |
| [Proposal #2.9-A] | | | |
| 0 | 0 | 0 | 0 |
| 1 | 0 | 1 | 0 |
| 2 | 1 | 0 | 0 |
| 3 | 1 | 1 | 0 |
| 4 | 1 | 2 | 1 |
| 5 | 0 | 2 | 1 |
| 6 | 1 | 3 | 1 |
| 7 | 0 | 3 | 1 |

Proposals 2.8-A and 2.9-A exemplarily show a method for more uniformly arranging DRS patterns in the DRS pattern group at a high layer RS index as compared to the proposals 2.8 and 2.9.

TABLE 38

| Layer index | DRS pattern group index | Code resource index (CS index) | Code resource index (WC index) |
|---|---|---|---|
| [Proposal #2.10-A] | | | |
| 0 | 0 | 0 | 0 |
| 1 | 0 | 0 | 1 |
| 2 | 1 | 0 | 0 |
| 3 | 1 | 0 | 1 |
| 4 | 0 | 0 | 2 |
| 5 | 1 | 0 | 2 |
| 6 | 0 | 1 | 2 |
| 7 | 1 | 1 | 2 |
| [Proposal #2.11-A] | | | |
| 0 | 0 | 0 | 0 |
| 1 | 0 | 0 | 1 |
| 2 | 1 | 0 | 0 |
| 3 | 1 | 0 | 1 |
| 4 | 1 | 0 | 2 |
| 5 | 0 | 0 | 2 |
| 6 | 1 | 1 | 2 |
| 7 | 0 | 1 | 2 |

Proposals 2.10-A and 2.11-A exemplarily show a method for more uniformly arranging DRS patterns in the DRS pattern group at a high layer RS index as compared to the proposals 2.10 and 2.11.

TABLE 39

| Layer index | DRS pattern group index | Code resource index (CS index) | Code resource index (WC index) |
|---|---|---|---|
| [Proposal #2.20] | | | |
| 0 | 0 | 0 | 0 |
| 1 | 0 | 1 | 0 |
| 2 | 1 | 0 | 0 |
| 3 | 1 | 3 | 0 |
| 4 | 1 | 1 | 0 |
| 5 | 1 | 4 | 0 |
| 6 | 1 | 2 | 0 |
| 7 | 1 | 5 | 0 |
| [Proposal #2.21] | | | |
| 0 | 0 | 0 | 0 |
| 1 | 0 | 1 | 0 |
| 2 | 1 | 0 | 0 |
| 3 | 1 | 1 | 0 |
| 4 | 1 | 2 | 0 |
| 5 | 1 | 0 | 1 |
| 6 | 1 | 1 | 1 |
| 7 | 1 | 2 | 1 |

Proposal 2.20 exemplarily shows a method for mapping an uneven layer RS pattern to the DRS pattern group. A detailed description thereof is as follows.
  DRS pattern group #0: 2 cyclic shifts (CSs); DRS pattern group #1: 6 cyclic shifts (CSs)
  Mapping of (cyclic shift, WC) to a layer index may be permuted in association with individual DRS pattern groups #0 and #1.
Proposal 21 exemplarily shows a method for mapping an uneven layer RS pattern to the DRS pattern group. A detailed description thereof is as follows.
  DRS pattern group #0: 2 cyclic shifts (CSs); DRS pattern group #1: 3 cyclic shifts (CSs) and 2 WCs
  Mapping of (cyclic shift, WC) to a layer index may be permuted in association with individual DRS pattern groups #0 and #1.

TABLE 40

| Layer index | DRS pattern group index | Code resource index (CS index) | Code resource index (WC index) |
|---|---|---|---|
| [Proposal #2.22] | | | |
| 0 | 0 | 0 | 0 |
| 1 | 0 | 0 | 1 |
| 2 | 1 | 0 | 0 |
| 3 | 1 | 1 | 0 |
| 4 | 1 | 2 | 0 |
| 5 | 1 | 0 | 1 |
| 6 | 1 | 1 | 1 |
| 7 | 1 | 2 | 1 |
| [Proposal #2.23] | | | |
| 0 | 0 | 0 | 0 |
| 1 | 0 | 0 | 1 |
| 2 | 1 | 0 | 0 |
| 3 | 1 | 1 | 0 |
| 4 | 1 | 2 | 0 |
| 5 | 1 | 3 | 0 |
| 6 | 1 | 4 | 0 |
| 7 | 1 | 5 | 0 |

Proposal 2.22 exemplarily shows a method for mapping an uneven layer RS pattern to the DRS pattern group. A detailed description thereof is as follows.
  DRS pattern group #0: 2 WCs; DRS pattern group #1: 2 WCs and 3 cyclic shifts (CSs)
  Mapping of (cyclic shift, WC) to a layer index may be permuted in association with individual DRS pattern groups #0 and #1.
Proposal 2.23 exemplarily shows a method for mapping an uneven layer RS pattern to the DRS pattern group. A detailed description thereof is as follows.
  DRS pattern group #0: 2 WCs; DRS pattern group #1: 6 cyclic shifts (CSs)
  Mapping of (cyclic shift, WC) to a layer index may be permuted in association with individual DRS pattern groups #0 and #1.

TABLE 41

| Layer index | DRS pattern group index | Code resource index (CS index) | Code resource index (WC index) |
|---|---|---|---|
| [Proposal #2.24] | | | |
| 0 | 0 | 0 | 0 |
| 1 | 0 | 1 | 0 |
| 2 | 1 | 0 | 0 |
| 3 | 1 | 1 | 0 |
| 4 | 0 | 0 | 1 |
| 5 | 1 | 0 | 1 |
| 6 | 0 | 1 | 1 |
| 7 | 1 | 1 | 1 |
| [Proposal #2.25] | | | |
| 0 | 0 | 0 | 0 |
| 1 | 0 | 0 | 2 |
| 2 | 1 | 0 | 0 |
| 3 | 1 | 0 | 2 |
| 4 | 0 | 0 | 1 |
| 5 | 1 | 0 | 1 |
| 6 | 0 | 0 | 3 |
| 7 | 1 | 0 | 3 |

Proposal 2.24 exemplarily shows a method for distributing an equal layer to the DRS pattern groups #0 and #1. A detailed description thereof is as follows.

DRS pattern groups #0 and #1: 2 cyclic shifts (CSs) and 2 WCs

Mapping of (group, cyclic shift, WC) to a layer index may be permuted in association with individual DRS pattern groups #0 and #1.

Proposal 25 exemplarily shows a method for distributing an equal layer to the DRS pattern groups #0 and #1. A detailed description thereof is as follows.

DRS pattern groups #0 and #1: 4 cyclic shifts (CSs) or four 4 WCs

Mapping of (group, cyclic shift, WC) to a layer index may be permuted in association with individual DRS pattern groups #0 and #1.

The power boosting according to one embodiment of the present invention will hereinafter be described. If CDM multiplexing is applied to DRS patterns proposed in the present invention, a beamforming gain is gradually reduced in proportion to higher rank transmission, and the number of layer RS that is CDM-processed in the same resources is increased. Therefore, power boosting for providing channel estimation performance appropriate for a high rank may be requested. In this case, if power (or power spectral density (PSD)) assigned to respective layers for PDSCH data transmission is different from power (or PSD) of an RS physical resource element (PRE) of the corresponding layer, a relative difference or ratio among an absolute value of power (or PSD) of the RS, power (or PSD) of data PRE, and power (or PSD) established in a layer RS of the RS PRE may be transmitted through cell-specific or UE(or RN)-specific RRC signaling, or may be transmitted through L1/L2 PDCCH control signaling. A detailed method for establishing power (or PDS) between PREs of an RS for each layer will hereinafter be described. Although the following proposals will disclose the operation for applying power boosting to RS physical resources when applying power (or PSD) to physical resources, the scope or spirit of the present invention is not limited thereto, and the present embodiment can also be applied to the scheme for establishing/signaling the relationship of data physical resources and RS physical power (or PSD) under a general situation.

Method 1: Allocation of the Same Layer RS & Data Power (or PSD)

In order to provide even channel estimation performance for each transmission layer, the same power (or PSD) for RS per transmission layer may be established. Therefore, in response to the number of layer RS patterns CDM-processed in a specific DRS pattern group, a total of power (or PSD) established in PREs of the corresponding DRS pattern group may be established in different ways according to DRS pattern groups. In addition, power boosting of the RS may be used in the present embodiment. Power (or PSD) of overall PDSCH and RS transmission resources and/or a transmission layer may be established and signaled, and a detailed description thereof is as follows.

Method 1: A difference or relative ratio between power (or PSD) of the data transmission PRE of the entire subframe and power (or PSD) of the RS transmission PRE may be configured. Specifically, when power boosting is performed, a difference in absolute value or relative ratio between power (or PSD) of a data transmission PRE and power (or PSD) of an RS transmission PRE in a transmission symbol to which RS is transmitted may be configured, and a difference in absolute value or relative ratio between power (or PSD) of a data transmission PRE on a transmission symbol to which no RS is transmitted and power (or PSD) of the RS transmission PRE may be configured. In this case, the relationship between power (or PSD) of the data transmission layer for each transmission layer and power (or PSD) of the corresponding layer RS may be calculated on the assumption that the same power is established in individual transmission layers. In this case, power (or PSD) between data and RS may be established in units of all PREs or each layer in consideration of different signal superposition situations of respective layers in a data transmission PRE and an RS transmission PRE. For example, during Rank-5 transmission, in the data transmission PRE, five transmission layer information (or signal or energy) or an arbitrary number of transmission layer information (or signal or energy) according to the precoding codebook are coded and then superposed. In contrast, in the RS PRE, the corresponding designated layer RS information (or signal or energy) is coded and superposed on the basis of the number of RS patterns multiplexed in the DRS patter group to which the corresponding PRE pertains. If necessary, a scaling factor may also be reflected such that the resultant data is configured. Configuration for the above, information regarding a absolute difference in power (or PDS) per PRE or layer between the configured data and RS, or information regarding a difference between the same in view of a relative ratio may be transmitted through cell-specific or UE(or RN)-specific RRC signaling, or may also be transmitted through L1/L2 PDCCH control signaling.

Method 2: Differently from Method 1, a difference or relative ratio between power (or PSD) of the data transmission layer of the entire subframe and power (or PSD) of the RS transmission layer may be configured. Specifically, when power boosting is performed, a difference in absolute value or relative ratio between power (or PSD) of a data transmission layer and power (or PSD) of an RS transmission layer in a transmission symbol to which RS is transmitted may be configured, and a difference in absolute value or relative ratio between power (or PSD) of a data transmission layer on a transmission symbol to which no RS is transmitted and power (or PSD) of the RS transmission layer may be configured. In this case, power (or PSD) between data and RS may be established in units of all PREs or each layer in consideration of signal superposition of respective layers in a data transmission PRE and an RS transmission PRE. For example, during Rank-5 transmission, in the data transmission PRE, five transmission layer information (or signal or energy) parts or an arbitrary number of transmission layer information (or signal or energy) parts are coded according to the precoding codebook, and then superposed. In contrast, in the RS PRE, the corresponding designated layer RS information (or signal or energy) is coded and superposed on the basis of the number of RS patterns multiplexed in the DRS patter group to which the corresponding PRE pertains. If necessary, the scaling factor may also be reflected in the above-mentioned result. Information regarding a difference in absolute value of power of individual transmission layers between the configured data and the RS or information regarding a difference in relative ratio of power between the data and the RS may be transmitted through cell-specific or UE(or RN)-specific RRC signaling, or may also be transmitted through L1/L2 PDCCH control signaling.

Scheme 2: Allocation of Different Layer RS & Data Power (or PSD)

In order to assign a weight in view of a channel estimation performance for each transmission layer and/or a decoding performance, different power values (or different PSD values) for RS may be assigned to individual transmission layers. Therefore, according to the number of layer RS patterns CDM-processed in a specific DRS pattern group, total power (or total PSD) to be established for PREs of the corresponding DRS pattern group may be differently established in individual DRS pattern groups. In addition, power boosting for RS (or DRS) may be used in the present embodiment. Power (or PSD) of overall PDSCH and RS transmission resources and/or a transmission layer may be established and signaled, and a detailed description thereof is as follows.

Method 1: A difference or relative ratio between power (or PSD) of the data transmission PRE of the entire subframe and power (or PSD) of the RS transmission PRE may be configured. Specifically, when power boosting is performed, a difference in absolute value or relative ratio between power (or PSD) of a data transmission PRE and power (or PSD) of an RS transmission PRE in a transmission symbol to which RS is transmitted may be configured, and a difference in absolute value or relative ratio between power (or PSD) of a data transmission PRE on a transmission symbol to which no RS is transmitted and power (or PSD) of the RS transmission PRE may be configured. In this case, the relationship between power (or PSD) of the data transmission layer for each transmission layer and power (or PSD) of the corresponding layer RS may be calculated on the assumption that different powers are assigned to respective transmission layers. In more detail, on the same assumption as described above, information regarding a difference in absolute value or relative ratio between powers of individual or specific layer types may be explicitly signaled, or the information regarding the difference may also be differently assigned to respective transmission layers according to a specific rule in response to an implicitly-applied rank value in such a manner that different power assignment can be identified. In this case, power (or PSD) between data and RS may be established in units of all PREs or each layer in consideration of different signal superposition situations of respective layers in a data transmission PRE and an RS transmission PRE. For example, during Rank-5 transmission, in the data transmission PRE, five transmission layer information (or signal or energy) parts or an arbitrary number of transmission layer information (or signal or energy) parts are coded according to the precoding codebook and then superposed. In contrast, in the RS PRE, the corresponding designated layer RS information (or signal or energy) is coded and superposed on the basis of the number of RS patterns multiplexed in the DRS patter group to which the corresponding PRE pertains. If necessary, the scaling factor may also be reflected such that the resultant data is configured. Information regarding a difference in absolute value of power (or PDS) among the configured data, RS PRE and transmission layer or information regarding a difference in relative ratio among the same may be transmitted through cell-specific or UE(or RN)-specific RRC signaling, or may also be transmitted through L1/L2 PDCCH control signaling. Needless to say, if power (or PSD) set values of RS and/or data differently established in units of a group of a transmission layer or in units of each layer, or indirect indication information associated with the power set values are explicitly signaled, this information may be transmitted through cell-specific signaling, UE (or RN)-specific RRC signaling or L1/L2 PDCCH control signaling.

Method 2: A difference or relative ratio between power (or PSD) of the data transmission layer of the entire subframe and power (or PSD) of the RS transmission layer may be configured. Specifically, when power boosting is performed, a difference in absolute value or relative ratio between power (or PSD) of a data transmission layer and power (or PSD) of an RS transmission layer in a transmission symbol to which RS is transmitted may be configured, and a difference in absolute value or relative ratio between power (or PSD) of a data transmission layer on a transmission symbol to which no RS is transmitted and power (or PSD) of the RS transmission layer may be configured. In this case, the relationship between power (or PSD) of the data transmission layer for each transmission layer and power (or PSD) of the corresponding layer RS may be calculated on the assumption that different powers are assigned to respective transmission layers. In more detail, on the same assumption as described above, information regarding a difference in absolute value or relative ratio between powers of individual or specific layer types may be explicitly signaled, or the information regarding the difference may also be differently assigned to respective transmission layers according to a specific rule in response to an implicitly-applied rank value in such a manner that different power assignment can be identified. In this case, power (or PSD) between data and RS may be established in units of all PREs or each layer in consideration of different signal superposition situations of respective layers in a data transmission PRE and an RS transmission PRE. For example, during Rank-5 transmission, in the data transmission PRE, five transmission layer information (or signal or energy) parts or an arbitrary number of transmission layer information (or signal or energy) parts are coded according to the precoding codebook and then superposed. In contrast, in the RS PRE, the corresponding designated layer RS information (or signal or energy) is coded and superposed on the basis of the number of RS patterns multiplexed in the DRS patter group to which the corresponding PRE pertains. If necessary, the scaling factor may also be reflected such that the resultant data is configured. Information regarding a difference in absolute value of power (or PDS) among the configured data, RS PRE and transmission layer or information regarding a difference in relative ratio among the same may be transmitted through cell-specific or UE(or RN)-specific RRC signaling, or may also be transmitted through L1/L2 PDCCH control signaling. Needless to say, if power (or PSD) set values of RS and/or data differently established in units of a group of a transmission layer or in units of each layer, or indirect indication information associated with the power set values are explicitly signaled, this information may be transmitted through cell-specific signaling, UE (or RN)-specific RRC signaling or L1/L2 PDCCH control signaling.

Figure 9:
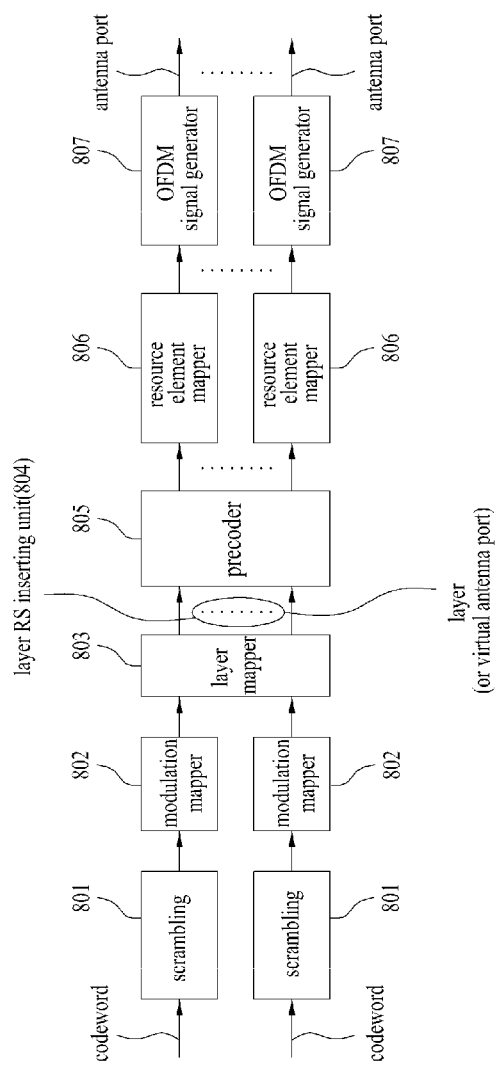
FIG. 9 is a block diagram illustrating a transmitter according to one embodiment of the present invention.

FIG. 9 is a block diagram illustrating a transmitter according to one embodiment of the present invention. FIG. 9 shows exemplary downlink transmission of the transmitter in a MIMO mode. In a MIMO system, a base station (BS) may transmit one or more codewords via a downlink. The codeword may be mapped to a transmission block from a higher layer. FIG. 9 assumes the exemplary case where two codewords are transmitted.

Referring to FIG. 9, the receiver includes a scrambling module 801, a modulation mapper 802, a layer mapper 803, a layer RS inserting module 804, a precoder 805, a resource element mapper 806, and an OFDM signal generator 807. The layer RS inserting module 804 may also be implemented as a functional block of the layer mapper 803 as necessary. The scrambling module 801 and the modulation mapper 802 are configured to process one or more codewords (CWs) to be complex symbols. Thereafter, the layer mapper 803 maps complex symbols of one or more codewords (CWs) to a plurality of layers. In this case, the number of layers is identical to a rank value. The layer RS inserting module 804 inserts the inventive layer RS into a layer (or (virtual) antenna port). The layer RS is defined by a DRS pattern group and a code resource index. If necessary, the layer RS may be defined by additional code resource index for 2-D CDM. In addition, the layer RS may also be defined using scrambling code resources. The precoder 805 distributes/assigns the layer to individual transmission antennas using a predetermined precoding matrix. The precoder 805 may be represented by a matrix of (Nt×v) (where Nt is the number of transmission antennas, and v is a spatial multiplexing rate). The precoder 805 may adaptively use the precoding matrix according to a channel situation (e.g., a precoding matrix indicator (PMI)). The set or aggregate of precoding matrixes predetermined by the transmitter/receiver is called a codebook. The resource element mapper 806 maps the precoded complex sequence to time-frequency resource elements for the corresponding antenna. The OFDM signal generator 807 generates an OFDM symbol by applying IFFT to each complex symbol mapped to the time-frequency resource element. The OFDM symbol is transmitted to each antenna through antenna ports.

FIGS. 10 to 14 exemplarily show the mapping relationship between a codeword and a layer according to one embodiment of the present invention. The codeword-to-layer mapping relationship may be equally or similarly applied even to the other case where the RS sequence is mapped to a layer. For convenience of description, FIGS. 10 to 14 exemplarily show the case where two codewords (CW1 and CW2) are mapped to a layer. However, under the condition of Nt transmission antennas, a maximum of Nt ranks may be used, and Nt codewords (CWs) may be independently transmitted. In FIGS. 10 to 14, each number input to the precoder may indicate a layer index (or virtual) antenna port).

Figure 10:
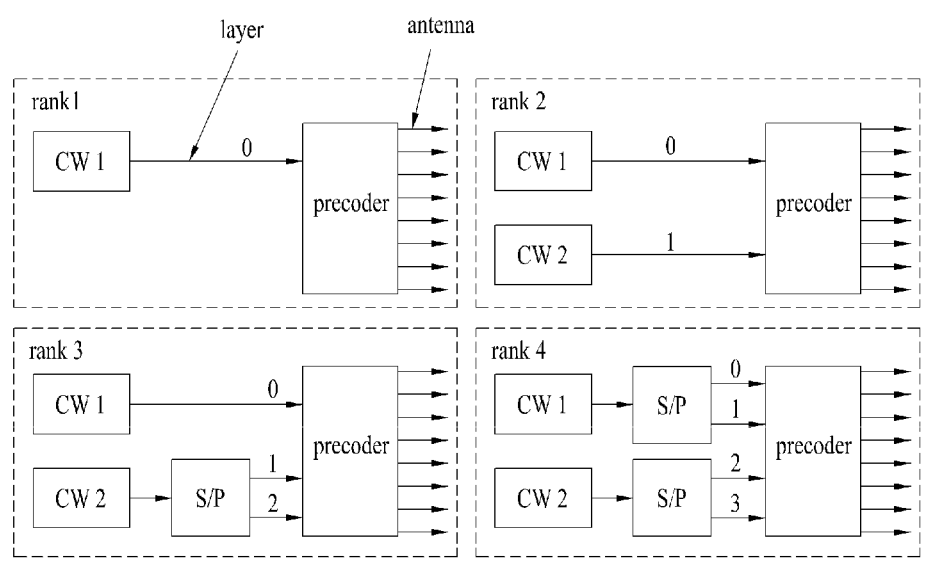
FIGS. 10, 11, 12, 13 and 14 exemplarily show the mapping relationship between a codeword and a layer according to one embodiment of the present invention.
Figure 11:
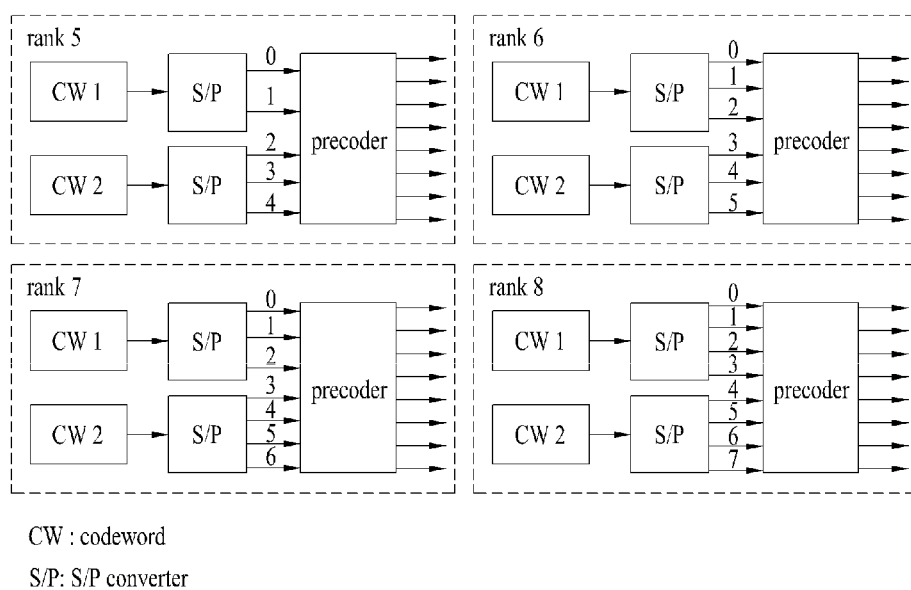

FIGS. 10 and 11 exemplarily show the basic codeword-to-layer mapping relationship. As can be seen from the codeword-to-layer mapping relationship shown in FIGS. 10 and 11, the order of layer indexes requires logical indexing in which layers to be added in response to the increasing rank are sequentially arranged (ordered). FIG. 10 exemplarily shows the case of Rank 1~4 and FIG. 11 exemplarily shows the other case of Rank 5~8. Referring to FIGS. 10 and 11, if one codeword (CW) is mapped to one layer, the codeword (CW) may be directly input to the precoder, or may be input to the precoder after passing through the serial/parallel (S/P) converter. In contrast, if one codeword (CW) is mapped to two or more layers, the codeword (CW) is mapped to two or more layers through the S/P converter, such that the mapped result is then input to the precoder. Function of the S/P converter may correspond to the layer mapper 803 of FIG. 9. The layer RS inserting module 805 shown in FIG. 9 may be functionally located between the S/P converter and the precoder. Table 42 numerically shows the codeword-to-layer mapping relationship of FIGS. 10 and 11.

TABLE 42

| Number of layers | Number of codewords | Codeword-to-layer mapping, $i = 0, 1, \ldots, M^{layer}_{symb}-1$ | |
|---|---|---|---|
| 1 | 1 | $x^{(0)}(i) = d^{(0)}(i)$ | $M^{layer}_{symb} = M^{(0)}_{symb}$ |
| 2 | 2 | $x^{(0)}(i) = d^{(0)}(i)$<br>$x^{(1)}(i) = d^{(1)}(i)$ | $M^{layer}_{symb} = M^{(0)}_{symb} = M^{(1)}_{symb}$ |

TABLE 42-continued

| Number of layers | Number of codewords | Codeword-to-layer mapping, $i = 0, 1, \ldots, M^{layer}_{symb}-1$ | |
|---|---|---|---|
| 3 | 2 | $x^{(0)}(i) = d^{(0)}(i)$<br>$x^{(1)}(i) = d^{(1)}(2i)$<br>$x^{(2)}(i) = d^{(1)}(2i + 1)$ | $M^{layer}_{symb} = M^{(0)}_{symb} = M^{(1)}_{symb}/2$ |
| 4 | 2 | $x^{(0)}(1) = d^{(0)}(2i)$<br>$x^{(1)}(i) = d^{(0)}(2i + 1)$<br>$x^{(2)}(i) = d^{(1)}(2i)$<br>$x^{(3)}(i) = d^{(1)}(2i + 1)$ | $M^{layer}_{symb} = M^{(0)}_{symb}/2 = M^{(1)}_{symb}/2$ |
| 5 | 2 | $x^{(0)}(i) = d^{(0)}(2i)$<br>$x^{(1)}(i) = d^{(0)}(2i + 1)$<br>$x^{(2)}(i) = d^{(1)}(3i)$<br>$x^{(3)}(i) = d^{(1)}(3i + 1)$<br>$x^{(4)}(i) = d^{(1)}(3i + 2)$ | $M^{layer}_{symb} = M^{(0)}_{symb}/2 = M^{(1)}_{symb}/3$ |
| 6 | 2 | $x^{(0)}(i) = d^{(0)}(3i)$<br>$x^{(1)}(i) = d^{(0)}(3i + 1)$<br>$x^{(2)}(i) = d^{(0)}(3i + 2)$<br>$x^{(3)}(i) = d^{(1)}(3i)$<br>$x^{(4)}(i) = d^{(1)}(3i + 1)$<br>$x^{(5)}(i) = d^{(1)}(3i +2)$ | $M^{layer}_{symb} = M^{(0)}_{symb}/3 = M^{(1)}_{symb}/3$ |
| 7 | 2 | $x^{(0)}(i) = d^{(0)}(3i)$<br>$x^{(1)}(i) = d^{(0)}(3i + 1)$<br>$x^{(2)}(i) = d^{(0)}(3i + 2)$<br>$x^{(3)}(i) = d^{(1)}(4i)$<br>$x^{(4)}(i) = d^{(1)}(4i + 1)$<br>$x^{(5)}(i) = d^{(1)}(4i + 2)$<br>$x^{(6)}(i) = d^{(1)}(4i + 3)$ | $M^{layer}_{symb} = M^{(0)}_{symb}/3 = M^{(1)}_{symb}/4$ |
| 8 | 2 | $x^{(0)}(i) = d^{(0)}(4i)$<br>$x^{(1)}(i) = d^{(0)}(4i + 1)$<br>$x^{(2)}(i) = d^{(0)}(4i + 2)$<br>$x^{(3)}(i) = d^{(0)}(4i + 3)$<br>$x^{(4)}(i) = d^{(1)}(4i)$<br>$x^{(5)}(i) = d^{(1)}(4i + 1)$<br>$x^{(6)}(i) = d^{(1)}(4i + 2)$<br>$x^{(7)}(i) = d^{(1)}(4i + 3)$ | $M^{layer}_{symb} = M^{(0)}_{symb}/4 = M^{(1)}_{symb}/4$ |

In Table 42, $x^{(a)}(i)$ is an i-th symbol of the layer 'a', and $d^{(n)}(i)$ is an i-th symbol of a codeword 'n'. $M^{layer}_{symb}$ is the number of complex symbols mapped to the layer, and $M^{(n)}_{symb}$ is the number of complex symbols contained in the codeword 'n'.

Figure 12:
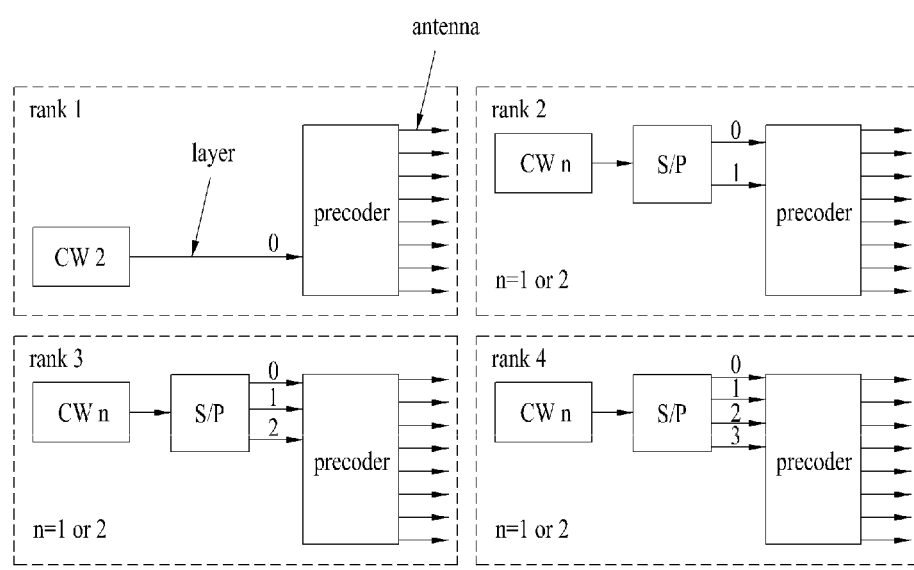

FIG. 12 shows the extended codeword-to-layer mapping relationship. The example of FIG. 12 may be used either for one case where a buffer corresponding to an arbitrary codeword is empty or for a rank overriding case. The case where the buffer corresponding to the codeword is empty may include HARQ (hybrid automatic repeat and request) transmission. Basic items of FIG. 12 are identical to those of FIGS. 10 and 11. Table 43 numerically shows the codeword-to-layer mapping relationship of FIG. 12.

TABLE 43

| Number of layers | Number of codewords | Codeword-to-layer mapping, $i = 0, 1, \ldots, M_{symb}^{layer} - 1$ | |
|---|---|---|---|
| 1 | 1 | $x^{(0)}(i) = d^{(1)}(i)$ | $M_{symb}^{layer} = M_{symb}^{(1)}$ |
| 2 | 1 | $x^{(0)}(i) = d^{(n)}(2i)$<br>$x^{(1)}(i) = d^{(n)}(2i + 1)$ | $M_{symb}^{layer} = M_{symb}^{(n)}/2$, $n = 1$ or $2$ |
| 3 | 1 | $x^{(0)}(i) = d^{(n)}(3i)$<br>$x^{(1)}(i) = d^{(n)}(3i + 1)$<br>$x^{(2)}(i) = d^{(n)}(3i + 2)$ | $M_{symb}^{layer} = M_{symb}^{(n)}/3$, $n = 1$ or $2$ |
| 4 | 1 | $x^{(0)}(i) = d^{(n)}(4i)$<br>$x^{(1)}(i) = d^{(n)}(4i + 1)$<br>$x^{(2)}(i) = d^{(n)}(4i + 2)$<br>$x^{(3)}(i) = d^{(n)}(4i + 3)$ | $M_{symb}^{layer} = M_{symb}^{(n)}/4$, $n = 1$ or $2$ |

In Table 43, $x^{(a)}(i)$ is an i-th symbol of the layer 'a', and $d^{(n)}(i)$ is an i-th symbol of the codeword 'n'. $M^{layer}_{symb}$ is the number of complex symbols mapped to the layer, and $M^{(n)}_{symb}$ is the number of complex symbols contained in the codeword 'n'.

Figure 13:
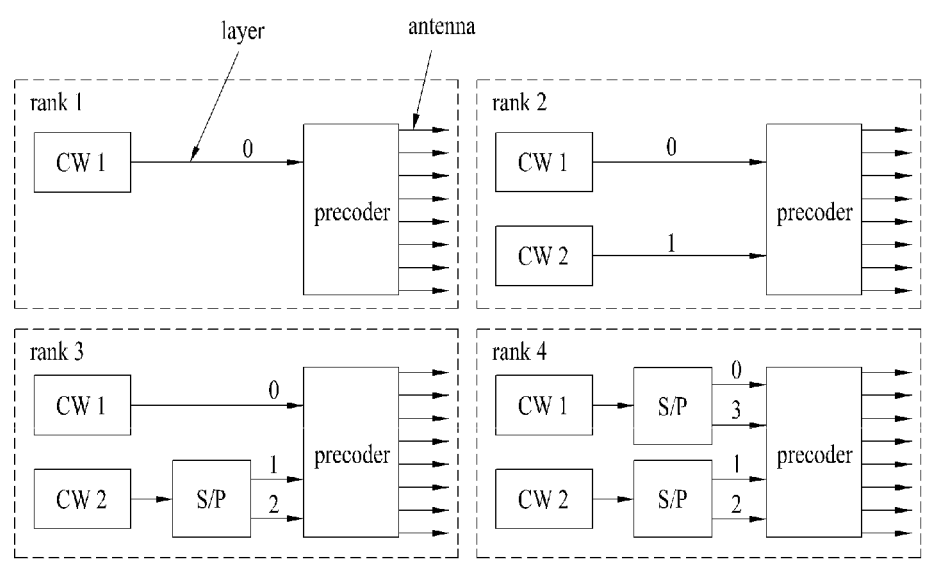
Figure 14:
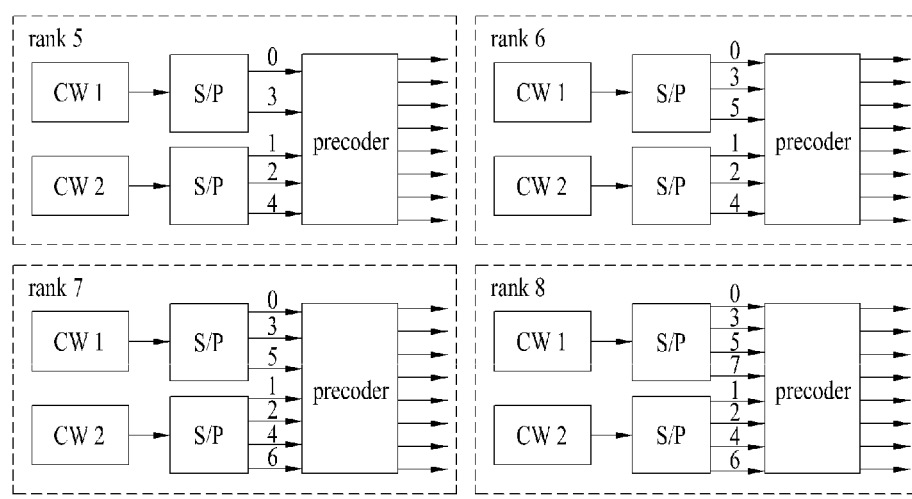

FIGS. 13 and 14 exemplarily show the codeword-to-layer mapping relationship in the case where the layer index is reordered. FIGS. 13 and 14 exemplarily show the case in which a different format of layer-RS port mapping is applied on the basis of a boundary between Rank-2 and Rank-3 without using the rank-independent layer-to-RS port mapping. The above-mentioned situation will hereinafter be described with reference to Tables 44 and 45. Table 44 exemplarily shows the layer-to-RS port mapping (or layer-RS port mapping) scheme in case of Rank-1 and Rank-2. Table 45 exemplarily shows the layer-to-RS port mapping (or layer-RS port mapping) scheme in case of ranks from Rank-3 to Rank-8. Table 44 shows some parts of the proposal #1.1-B, and Table 45 shows some parts of the proposal #1.1-D.

TABLE 44

| Layer index | DRS pattern group index | Code resource index (opt. 2) |
|---|---|---|
| 0 | 0 | 0 |
| 1 | 0 | 1 |

TABLE 45

| Layer index | DRS pattern group index | Code resource index (opt. 2) |
|---|---|---|
| 0 | 0 | 0 |
| 1 | 1 | 0 |
| 2 | 1 | 1 |
| 3 | 0 | 1 |
| 4 | 1 | 2 |
| 5 | 0 | 2 |
| 6 | 1 | 3 |
| 7 | 0 | 3 |

In Tables 44 and 45, the order of layer indexes may requires logical indexing in which layers to be added in response to the increasing rank are sequentially arranged (ordered). If necessary, the order of the layer indexes may be rearranged according to a specific purpose. FIGS. 13 and 14 show the example of layer ordering.

Reordering of layer indexes may be carried out by a series of preprocessing modules, or may be understood as logical change of the mapping relationship between the layer index and the (virtual) antenna port. For example, reordering of layer indexes may also be understood by a method for sequentially indexing newly added/defined layers in response to the increasing rank value when mapping the layer index of FIG. 12 to the (virtual) antenna port. In this case, it may be understood that the layer RS resource is mapped on the basis of a layer index or (virtual) antenna port. Basic items are identical to those of FIGS. 10, 11, and 12.

Figure 15:
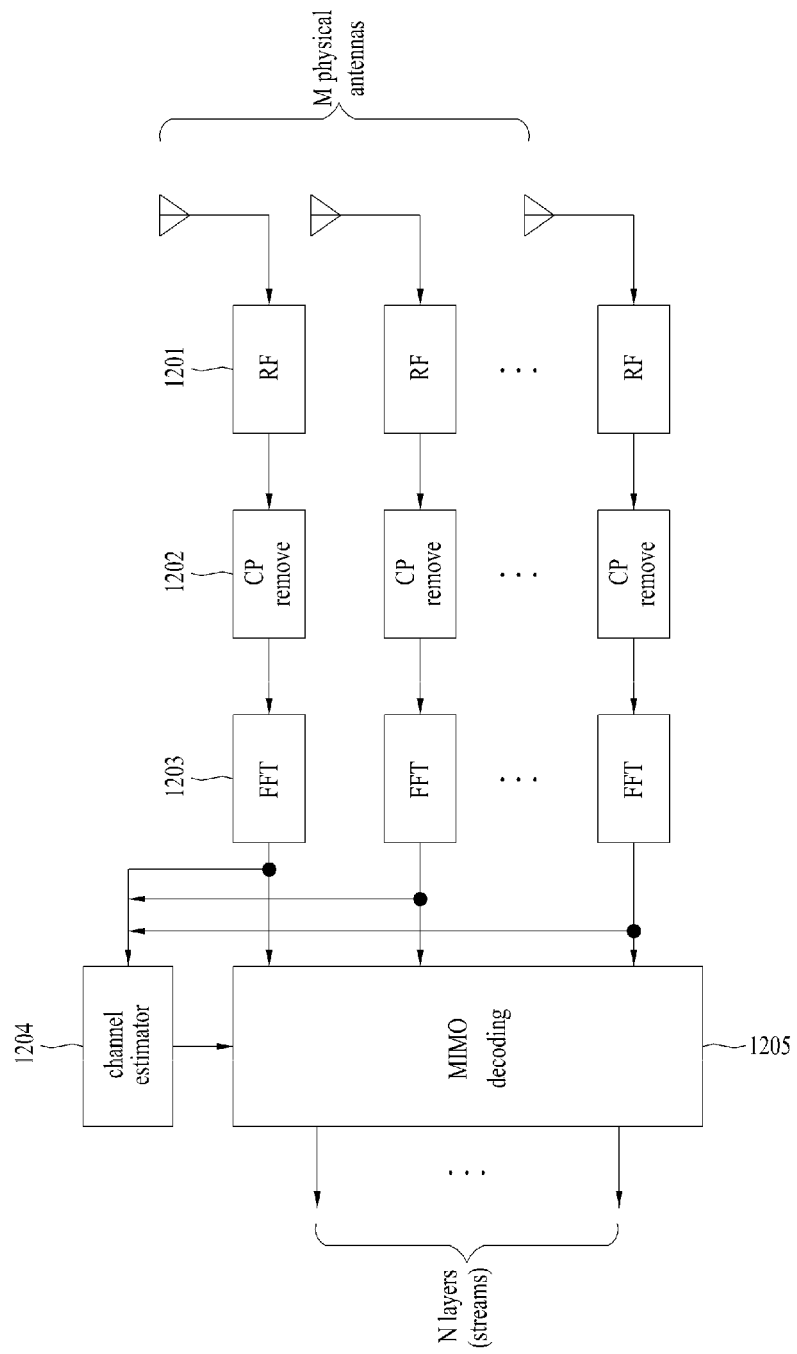
FIG. 15 is a block diagram illustrating a receiver according to one embodiment of the present invention.

FIG. 15 is a block diagram illustrating a receiver according to one embodiment of the present invention. FIG. 15 shows a method for enabling a user equipment (UE) to receive signals from a base station (BS) under a MIMO mode.

Referring to FIG. 15, the receiver includes an antenna, a radio frequency (RF) module block 1201, a CP remove block 1202, a Fast Fourier Transform (FFT) block 1203, a channel estimator 1204, and a MIMO decoding block 1205. The RF module block 1201 may amplify and filter each downlink transmission signal that is input to M (where M≥1) physical reception antennas. The CP remove block 1202 removes a time sample part corresponding to a CP from the reception OFDM symbol interval. The FFT block 1203 performs FFT on the CP-removed sample. The channel estimator 1204 may be connected to an output terminal of the FFT block. From among a subcarrier signal sample region corresponding to the PRB-unit frequency resource region pre-scheduled through a PDCCH for DL channel assignment, signals are detected/extracted from REs mapped to RS (e.g., demodulation reference signal (DM-RS)) in such a manner that channel estimation is performed. A transmitter of the base station (BS) may apply the same precoding as in data REs to DM-RS RE, and the corresponding precoder is combined with an RF channel during the channel estimation process of the UE receiver such that it can form an equivalent channel coefficient. The MIMO decoding block 1205 constructs the (N×M) channel matrix for data REs contained in a frequency resource domain on the basis of signals extracted from DM-RS REs using the channel estimator 1204, performs MIMO decoding, and forms and outputs N reception layers or N reception streams. Thereafter, the decoding process and channel decoding process may be applied to N reception layers or N reception streams during the UE reception process.

Figure 16:
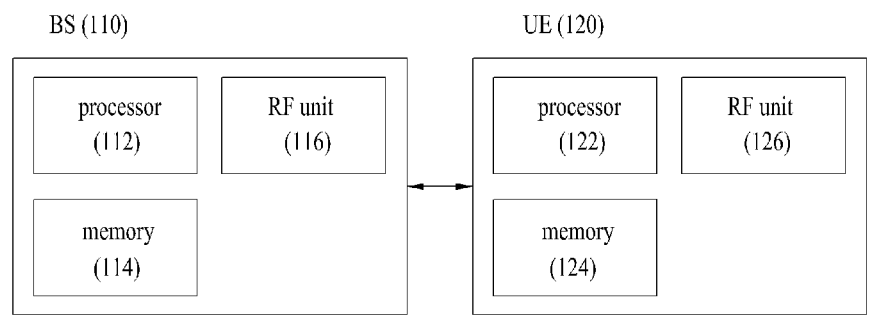
FIG. 16 is a block diagram illustrating a base station (BS) and a user equipment (UE) according to one embodiment of the present invention.

FIG. 16 is a block diagram illustrating a base station (BS) and a user equipment (UE) applicable to embodiments of the present invention.

Referring to FIG. 16, a wireless communication system includes a BS 110 and a UE 120. In downlink, a transmitter may be a part of the BS 110, and a receiver may be a part of the UE 120. In uplink, a transmitter may be a part of the UE 120, and a receiver may be a part of the BS 110. The BS 110 includes a processor 112, a memory 114, and a radio frequency (RF) unit 116. The processor 112 may be constructed to implement the procedures and/or methods disclosed in the embodiments of the present invention. The memory 114 may be connected to a processor 112, and store various information related to operations of the processor 112. The RF unit 116 is connected to the processor 112, and transmits and/or receives RF signals. The UE 120 includes a processor 122, a memory 124, and an RF unit 126. The processor 122 may be constructed to implement the procedures and/or methods disclosed in the embodiments of the present invention. The memory 124 may be connected to a processor 122, and store various information related to operations of the processor 122. The RF unit 126 is connected to the processor 122, and transmits and/or receives RF signals. The BS 110 and/or the UE 120 may include a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. Software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Exemplary embodiments of the present invention can be applied to a wireless communication system. In more detail, the exemplary embodiments of the present invention can be applied to a method and apparatus for transmitting a reference signal (RS) using multiple antennas.

The invention claimed is:

1. A method for transmitting signals by a communication apparatus in a wireless communication system, the method comprising:
mapping, by the communication apparatus, a plurality of reference signals to one or more resource blocks; and
transmitting, by the communication apparatus, the mapped plurality of reference signals on respective antenna ports of a first and second set of antenna ports,
wherein each reference signal transmitted on the first set of antenna ports is code division multiplexed to a first group of resource elements in the one or more resource blocks by using a corresponding orthogonal sequence,
wherein each reference signal transmitted on the second set of antenna ports is code division multiplexed to a second group of resource elements in the one or more resource blocks by using a corresponding orthogonal sequence, and
wherein the first set of antenna ports comprises antenna ports {N, N+1, N+4, N+6} and the second set of antenna ports comprises antenna ports {N+2, N+3, N+5, N+7}.

2. The method according to claim 1, wherein the first group of resource elements or the second group of resource elements comprise three pairs of resource elements in one resource block, two resource elements in each of the three pairs are contiguous in a time domain, and two neighboring pairs of the three pairs are separated by at least four subcarriers in a frequency domain.

3. The method according to claim 1, wherein the first group of resource elements or the second group of resource elements is grouped as shown in the Table below:

|  | Even-numbered slot | | Odd-numbered slot | |
| --- | --- | --- | --- | --- |
|  | l = M | l = M + 1 | l = M | l = M + 1 |
| k = 11 | G0 | G0 | G0 | G0 |
| k = 10 | G1 | G1 | G1 | G1 |
| k = 6 | G0 | G0 | G0 | G0 |
| k = 5 | G1 | G1 | G1 | G1 |
| k = 1 | G0 | G0 | G0 | G0 |
| k = 0 | G1 | G1 | G1 | G1 | where k represents a subcarrier index in a resource block, l represents an orthogonal frequency division multiplexing (OFDM) symbol index, M represents an integer of 0 to 5, G0 represents the first group of resource elements, and G1 represents the second group of resource elements.

4. The method according to claim 1, wherein each reference signal of the plurality of reference signals is multiplied by a corresponding orthogonal sequence in units of two or four neighboring resource elements with a same subcarrier index.

5. The method according to claim 1, wherein the plurality of reference signals are used for demodulation of a physical downlink shared channel (PDSCH).

6. A method for receiving signals by a communication apparatus in a wireless communication system, the method comprising:
receiving, by the communication apparatus, a plurality of reference signals in one or more resource blocks on respective antenna ports of a first and second set of antenna ports,
wherein each reference signal received on the first set of antenna ports is code division de-multiplexed from a first group of resource elements in the one or more resource blocks by using a corresponding orthogonal sequence,
wherein each reference signal received on the second set of antenna ports is code division de-multiplexed from a second group of resource elements in the one or more resource blocks by using a corresponding orthogonal sequence, and
wherein the first set of antenna ports comprises antenna ports {N, N+1, N+4, N+6} and the second set of antenna ports comprises antenna ports {N+2, N+3, N+5, N+7}.

7. The method according to claim 6, wherein the first group of resource elements or the second group of resource elements comprise three pairs of resource elements in one resource block, two resource elements in each of the three pairs are contiguous in a time domain, and two neighboring pairs of the three pairs are separated by at least four subcarriers in a frequency domain.

8. The method according to claim 6, wherein the first group of resource elements or the second group of resource elements is grouped as shown in the Table below:

|  | Even-numbered slot | | Odd-numbered slot | |
| --- | --- | --- | --- | --- |
|  | l = M | l = M + 1 | l = M | l = M + 1 |
| k = 11 | G0 | G0 | G0 | G0 |
| k = 10 | G1 | G1 | G1 | G1 |
| k = 6 | G0 | G0 | G0 | G0 |
| k = 5 | G1 | G1 | G1 | G1 |
| k = 1 | G0 | G0 | G0 | G0 |
| k = 0 | G1 | G1 | G1 | G1 | where k represents a subcarrier index in a resource block, l represents an orthogonal frequency division multiplexing (OFDM) symbol index, M represents an integer of 0 to 5, G0 represents the first group of resource elements, and G1 represents the second group of resource elements.

9. The method according to claim 6, wherein each reference signal of the plurality of reference signals is multiplied by a corresponding orthogonal sequence in units of two or four neighboring resource elements with a same subcarrier index.

10. The method according to claim 6, wherein the plurality of reference signals are used for demodulation of a physical downlink shared channel (PDSCH).

11. A communication apparatus for transmitting signals in a wireless communication system, the communication apparatus comprising:
a radio frequency (RF) unit; and
a processor operatively connected to the RF unit and configured to:
map a plurality of reference signals to one or more resource blocks, and
transmit the mapped plurality of reference signals on respective antenna ports of a first and second set of antenna ports,
wherein each reference signal transmitted on the first set of antenna ports is code division multiplexed to a first group of resource elements in the one or more resource blocks by using a corresponding orthogonal sequence,
wherein each reference signal transmitted on the second set of antenna ports is code division multiplexed to a second group of resource elements in the one or more resource blocks by using a corresponding orthogonal sequence, and
wherein the first set of antenna ports comprises antenna ports {N, N+1, N+4, N+6} and the second set of antenna ports comprises antenna ports {N+2, N+3, N+5, N+7}.

12. The communication apparatus according to claim 11, wherein the first group of resource elements or the second group of resource elements comprise three pairs of resource elements in one resource block, two resource elements in each of the three pairs are contiguous in a time domain, and two neighboring pairs of the three pairs are separated by at least four subcarriers in a frequency domain.

13. The communication apparatus according to claim 11, wherein the first group of resource elements or the second group of resource elements is grouped as shown in the Table below:

|  | Even-numbered slot | | Odd-numbered slot | |
| --- | --- | --- | --- | --- |
|  | l = M | l = M + 1 | l = M | l = M + 1 |
| k = 11 | G0 | G0 | G0 | G0 |
| k = 10 | G1 | G1 | G1 | G1 |
| k = 6 | G0 | G0 | G0 | G0 |
| k = 5 | G1 | G1 | G1 | G1 |
| k = 1 | G0 | G0 | G0 | G0 |
| k = 0 | G1 | G1 | G1 | G1 | where k represents a subcarrier index in a resource block, l represents an Orthogonal Frequency Division Multiplexing (OFDM) symbol index, M represents an integer of 0 to 5, G0 represents the first group of resource elements, and G1 represents the second group of resource elements.

14. The communication apparatus according to claim 11, wherein each reference signal of the plurality of reference signals is multiplied by a corresponding orthogonal sequence in units of two or four neighboring resource elements with a same subcarrier index.

15. The communication apparatus according to claim 11, wherein the plurality of reference signals are used for demodulation of a physical downlink shared channel (PDSCH).

16. A communication apparatus for receiving signals in a wireless communication system, the apparatus comprising:
a radio frequency (RF) unit; and
a processor operatively connected to the RF unit and configured to:
receive a plurality of reference signals in one or more resource blocks on respective antenna ports of a first and second set of antenna ports,
wherein each reference signal received on the first set of antenna ports is code division de-multiplexed from a first group of resource elements in the one or more resource blocks by using a corresponding orthogonal sequence,
wherein each reference signal received on the second set of antenna ports is code division de-multiplexed from a second group of resource elements in the one or more resource blocks by using a corresponding orthogonal sequence, and
wherein the first set of antenna ports comprises antenna ports {N, N+1, N+4, N+6} and the second set of antenna ports comprises antenna ports {N+2, N+3, N+5, N+7}.

17. The communication apparatus according to claim 16, wherein the first group of resource elements or the second group of resource elements comprise three pairs of resource elements in one resource block, two resource elements in each of the three pairs are contiguous in a time domain, and two neighboring pairs of the three pairs are separated by at least four subcarriers in a frequency domain.

18. The communication apparatus according to claim 16, wherein the first group of resource elements or the second group of resource elements is grouped as shown in the Table below:

|  | Even-numbered slot | | Odd-numbered slot | |
| --- | --- | --- | --- | --- |
|  | l = M | l = M + 1 | l = M | l = M + 1 |
| k = 11 | G0 | G0 | G0 | G0 |
| k = 10 | G1 | G1 | G1 | G1 |
| k = 6 | G0 | G0 | G0 | G0 |
| k = 5 | G1 | G1 | G1 | G1 |
| k = 1 | G0 | G0 | G0 | G0 |
| k = 0 | G1 | G1 | G1 | G1 | where k represents a subcarrier index in a resource block, l represents an Orthogonal Frequency Division Multiplexing (OFDM) symbol index, M represents an integer of 0 to 5, G0 represents the first group of resource elements, and G1 represents the second group of resource elements.

19. The communication apparatus according to claim 16, wherein each reference signal of the plurality of reference signals is multiplied by a corresponding orthogonal sequence in units of two or four neighboring resource elements with a same subcarrier index.

20. The communication apparatus according to claim 16, wherein the plurality of reference signals are used for demodulation of a physical downlink shared channel (PDSCH).

* * * * *